United States Patent [19]

Carnes et al.

[11] 3,922,539

[45] Nov. 25, 1975

[54] IMPROVED CIRCUIT FOR DETECTING THE PASSAGE OF AN ARTICLE BEARING A REPETITIVE MARKING

[75] Inventors: W. Robert Carnes, Darien; John J. Balogh, Jr., Trumbull; Lester L. Selnick, Ridgefield, all of Conn.

[73] Assignee: Pitney-Bowes, Inc., Stamford, Conn.

[22] Filed: Apr. 2, 1974

[21] Appl. No.: 457,395

[52] U.S. Cl. .......... 235/183; 235/61.11 E; 250/565; 250/568; 250/571
[51] Int. Cl.² .................. G06G 7/18; G06K 19/06
[58] Field of Search ..................... 235/183, 61.11 E; 340/146.3 Z, 146.3 AC, 146.3 AE; 250/224, 559, 560, 565, 571, 556; 209/111.7

[56] References Cited
UNITED STATES PATENTS

| | | | |
|---|---|---|---|
| 3,246,295 | 4/1966 | DeClaris et al. | 340/146.3 |
| 3,564,268 | 2/1971 | Bayne et al. | 250/556 |
| 3,636,332 | 1/1972 | Nelson et al. | 235/183 |
| 3,758,752 | 9/1973 | Kapsambelis et al. | 235/61.11 E |
| 3,787,689 | 1/1974 | Fidelman | 250/560 |

*Primary Examiner*—Felix D. Gruber
*Attorney, Agent, or Firm*—William D. Soltow, Jr.; Albert W. Scribner; Robert S. Salzman

[57] ABSTRACT

The apparatus disclosed relates to a circuit arrangement for detecting the passage of an article bearing a repetitive marking adapted to repetitively alter the reflectance of light impinging on the marking as the article is transported through an examination station.

The arrangement includes a first circuit including a photosensitive device positioned at the examination station for impingement by light which is reflected from an article being transported through the station and adapted for generating an alternating signal as the article is transported having a frequency corresponding to the frequency of the repetitive markings on the article.

A second circuit provides an output signal proportional to the integral of the signal during the transit of the article from the examination station.

A third circuit disables the integrating circuit in the absence of an article at the examination station and enables the second circuit to form the integral of said alternating signal during the transit of the article through the examination station.

A comparator circuit is included for providing a first DC output level when the amplitude of an input signal applied thereto exceeds the amplitude of a reference signal applied thereto, and for providing a second DC output level when the amplitude of the input signal is less than the amplitude of the reference signal.

Further apparatus is provided for coupling the integral of the alternating signal from said integrating means to the first terminal of said comparator and for applying a reference potential to said second input terminal.

4 Claims, 12 Drawing Figures

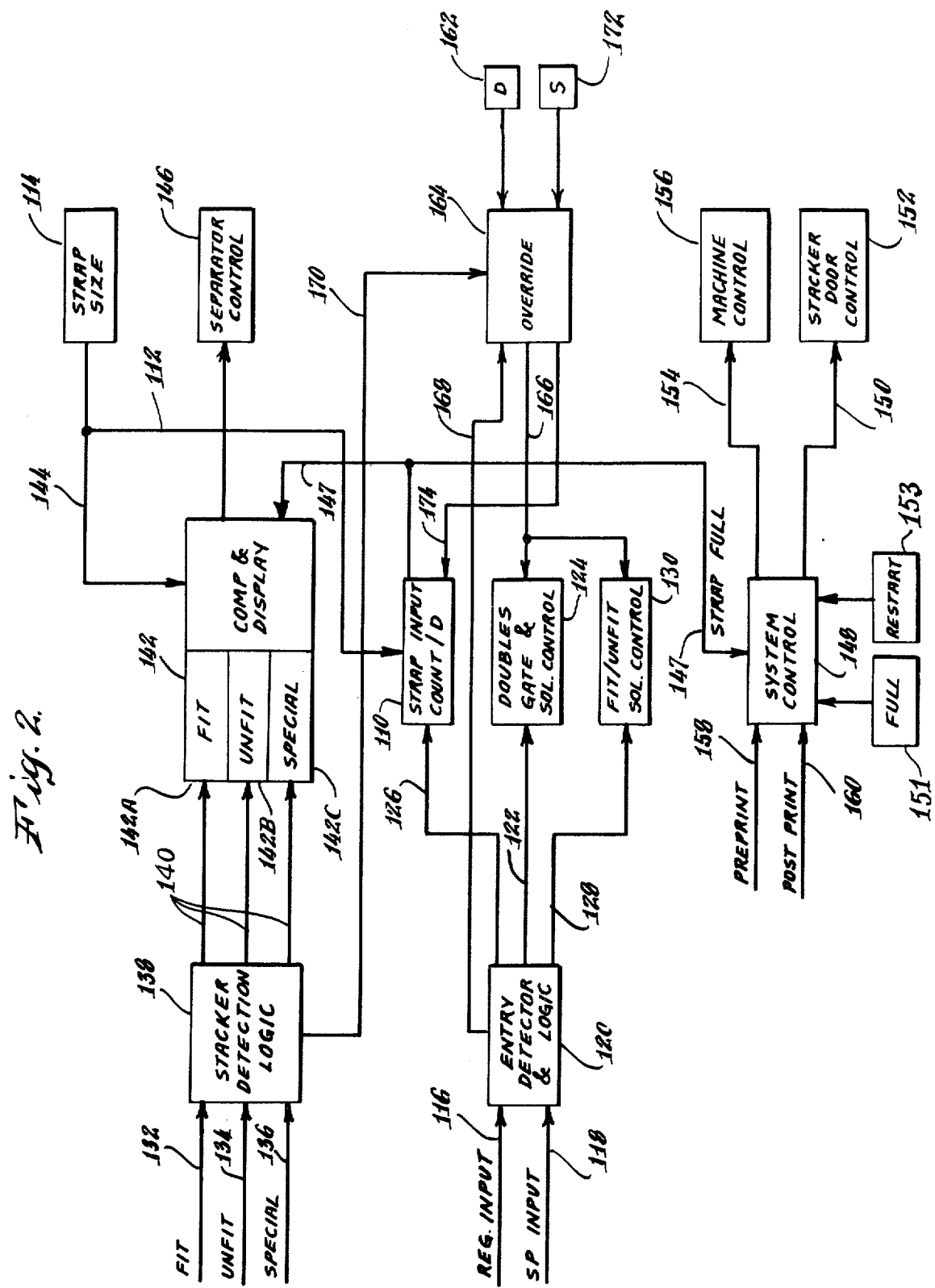

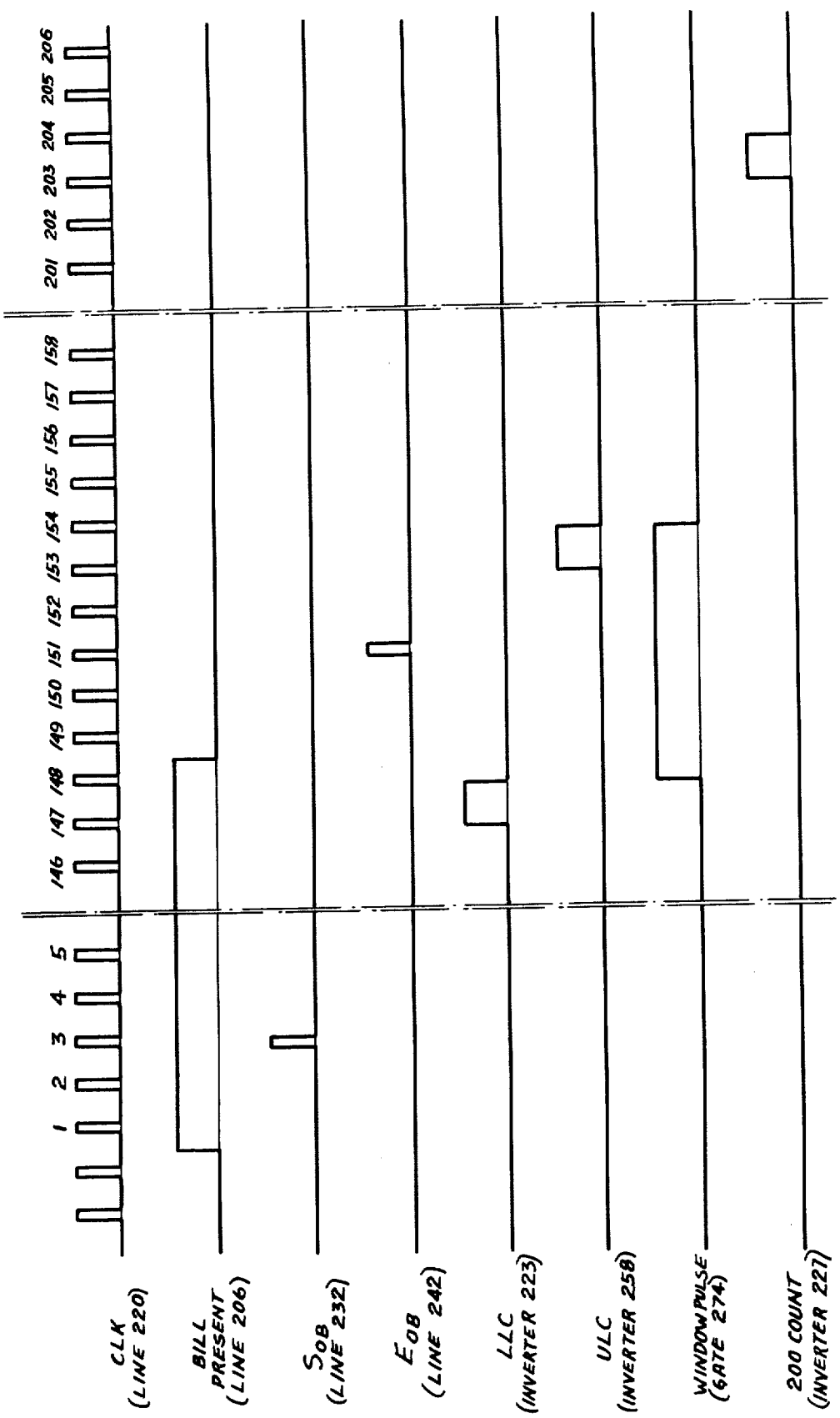

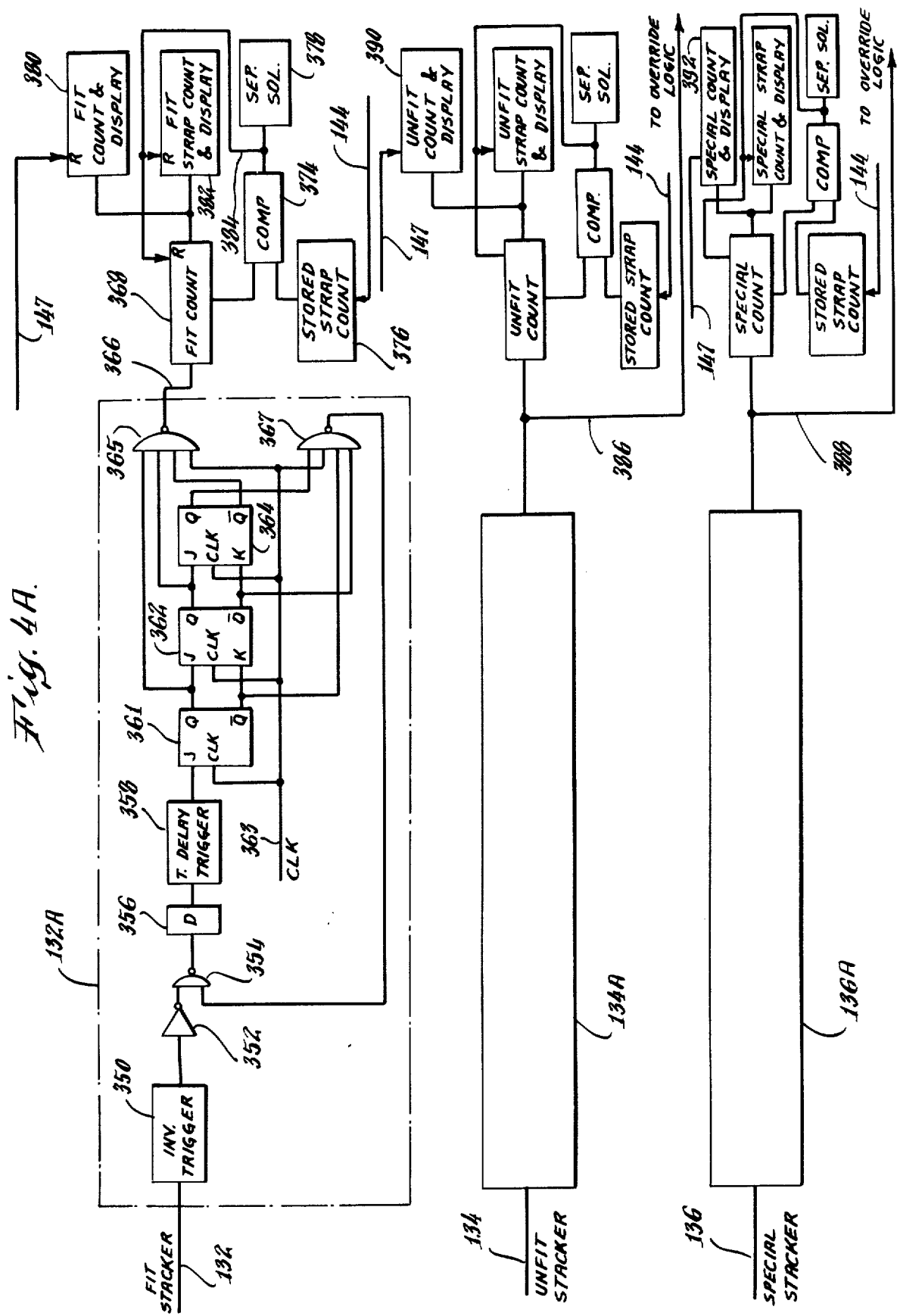

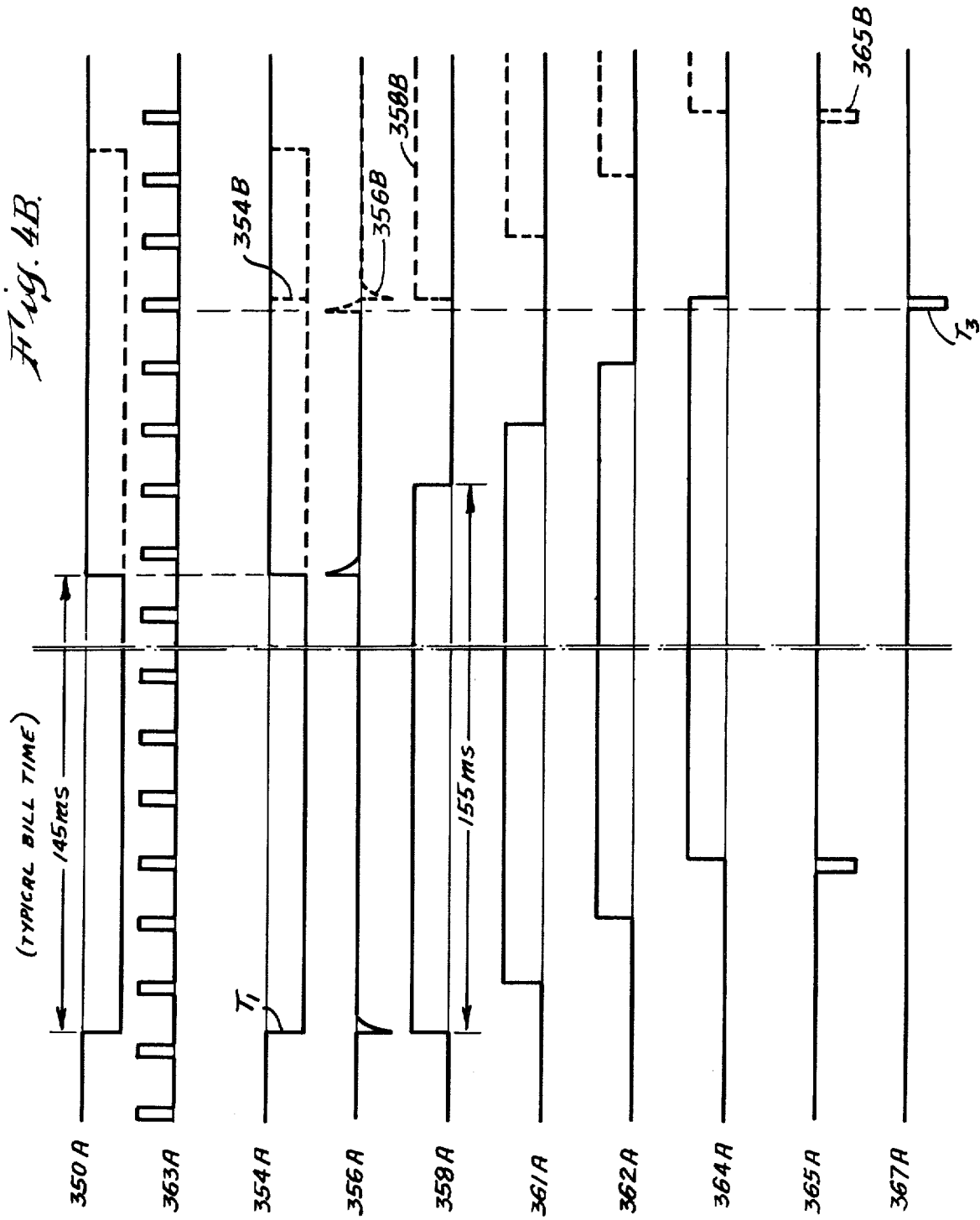

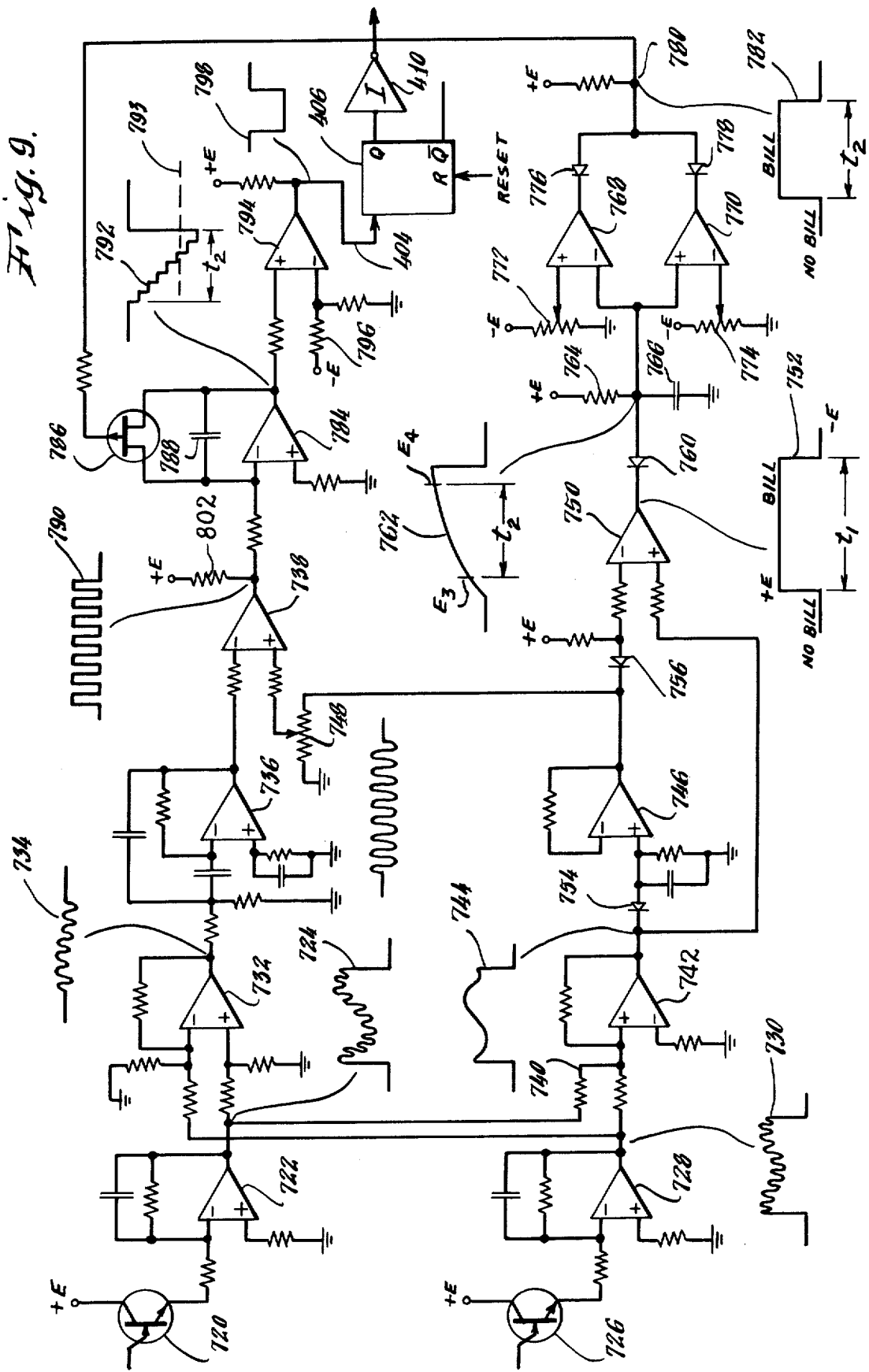

AN IMPROVED CIRCUIT FOR DETECTING THE PASSAGE OF AN ARTICLE BEARING A REPETITIVE MARKING

This invention relates to apparatus for automatically sorting unfit currency from fit currency. The invention relates more particularly to an improved apparatus for enhancing the sorting procedures and for increasing the security against loss or theft of currency during the procedure.

Currency which has been in circulation for a period of time becomes soiled, worn, and at times damaged and is no longer considered fit for continued use. The unfit currency is removed from circulation and is destroyed. Federal Reserve Banks throughout the United States have been assigned the responsibility of separating the fit from the unfit currency which is forwarded to them from correspondent banks. After sorting, unfit currency is batched and is transmitted to the Bureau of Printing and Engraving for destruction.

Many millions of dollars in unfit currency is removed from circulation daily and the examination and sorting of this currency becomes a significant task. In practice, currency is sorted manully by trained workers at the Federal Reserve Banks. The segregated unfit bills are then demonetized by marking or mutilating in a distinctive manner prior to destruction.

The transmittal, handling, accounting and security of currency has been accomplished by a procedure developed over the years whereby currency is collected into bundles or straps. A strap of currency, which is generally bound together by a paper belt, typically contains 100 bills of a same denomination. At times, the strap can contain a lesser or greater predetermined number of bills. During the fitness sorting procedure, an original strap is broken by a worker; the bills of the strap are visually examined; and the bills are regrouped into a pile containing only fit bills and a pile containing unfit bills. Upon depletion of an original strap of bills, the bills in the fit and unfit piles are counted in order to verify that the original strap contained a full complement of bills. After verification of the count, straps of fit bills are formed for recirculation while straps of unfit bills are formed for subsequent demonetizing and destruction. The demonetizing is then subsequently accomplished by breaking a strap of unfit bills, permanently marking or mutilating the bills, recounting the demonitized bills and again forming the same into a strap for transmittal to the Bureau of Printing and Engraving for destruction.

The described fitness sorting and demonetizing process is disadvantageous in several respects. Although workers are trained for making a visual examination of the fitness of a bill, the determination is a subjective one which is made during a tedious repetitive process and the results often vary significantly within a Federal Reserve Bank and between the different Federal Reserve Banks. In addition, the necessity for establishing an accurate accounting and security for fit, unfit and demonetized bills further complicates the overall fitness examination and demonetizing procedure.

Nonetheless, the use of the strap procedure for transmitting and handling currency has merits which recommend its continued use. It would be desirable however, to automate some of the manually performed tasks with a method and apparatus which is compatible with this procedure. While machine methods for sorting fit and unfit currency and for demonetizing unfit currency are known, these methods are generally complex, expensive, time consuming and are either incompatible or inconvenient for use with the strap procedure of handling currency. In addition, they are susceptible to defeat by defects the currency or in the handling of the currency which heretofore were correctable by a worker during a manual sorting process or which, by virture of the manual nature of the handling, did not occur. These defects are, for example, the adhesion of one bill to another; the overlapping of successively fed bills at an automated examination station, and the severe mutilation of bills being examined. Furthermore, known apparatus for the demonetizing of unfit bills have not provided the degree of security necessary to guarantee against the theft of unfit currency and the unauthorized reintroduction of demonetized currency into circulation.

In copending U.S. Pat. application Ser. No. 457,366 which is filed concurrently herewith and which is assigned to the assignee of this invention, there is disclosed and claimed and improved method and apparatus for sorting fit and unfit currency.

An object of this invention is to provide in a currency examination apparatus, an improved electrical means for accounting, sorting and separating currency into straps, and causing a verifiable display of the results of these steps.

It is a further object of the present invention to provide a logic circuitry operating on a timed sequence for rejecting or accepting the bill in accordance with certain dimensional and spacing criteria.

It is another object of the present invention to provide logic circuitry for insuring the accuracy of the bills counted as they are removed after sorting.

It is another object of the present invention for providing logic circuitry overriding certain selection sequences in accordance with a desired operation.

In accordance with the foregoing objects, the present invention utilizes an electronic verification and control system for securing an input count analysis of input bills for various entry conditions and their state of fitness, and automatic separator insertion for packaging bills in a desired quantity for delivery.

The system includes means for entering the quantity of a block of currency, commonly referred to as a strap, in terms of the number of bills contained within the strap. A detection circuit detect various entry conditions and determines quality and fitness. Bills are sorted accordingly, and a total count is maintained. The entry is monitored for condition factors such as bill size, double bills, or bills too closely spaced, which provides for rejection of improper entry as well as inhibiting the operation of the input count for consistency. Verification of input count is provided by further count detection in the area of collection. Sorting, in accordance with detection and gating of the fit and unfit bills is also provided, as well as individualized count control and display. Consistency of strap size is maintained by automatic insertion of card separators between straps in accordance with a desired strap size. A logic system activates machine control sequences in accordance with strap size data provided by tracking the input count and checking for a comparison. Separator control provided by logic responsive to the count in the collector area, also in accordance with the strap size data.

In addition, override controls are provided for allowing the manual insertion of a rejected bill. Since demonetization is effected by print sequences, for demonetization control, preprint and postprint detections are provided along with logic activating the system for controlling machine operation in accordance with improperly sensed preprint and postprint detection.

The foregoing objects and brief description of the present invention will be set forth in greater detail in the following more detailed specification and the appended drawings wherein FIG. 1 is a perspective view illustrating the functional relationship of the apparatus of the present invention, FIG. 2 is a generalized electronic system diagram explaining the control interrelationships of the present invention.

FIG. 3B is a timing diagram related to FIG. 3A,

FIG. 4A is a detail of the stacker detection and counting logic,

FIG. 4B is a timing diagram related to FIG. 4A,

FIG. 9 is a schematic diagram of a preprint detection circuit arrangement, and,

Figure 1:
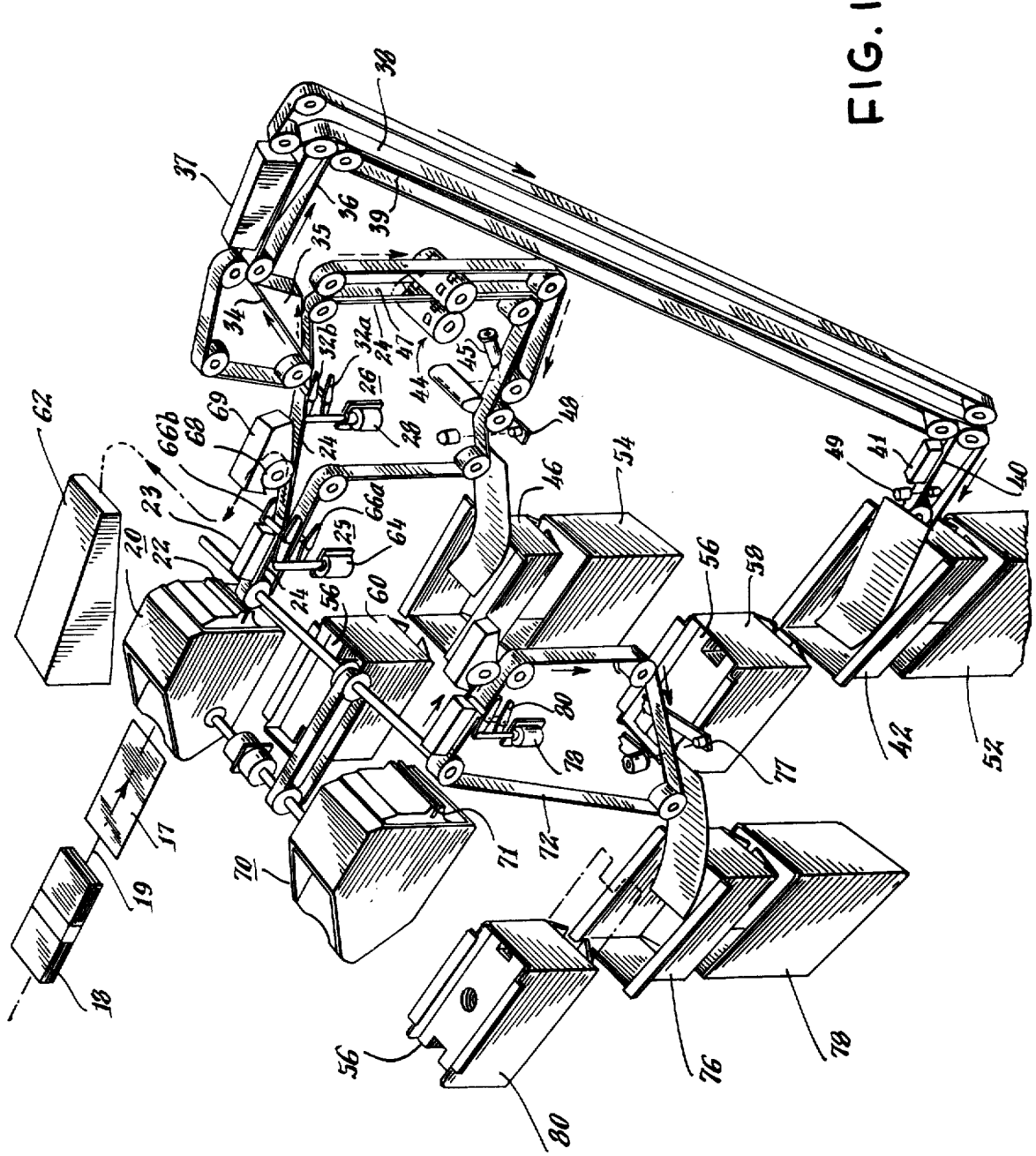

The introduction and the progress of bills through the apparatus will be described generally with reference to FIG. 1. Individual bills 17 are removed from a strap of bills 18 by an operator and are manually introduced in a direction along a principle axis 19 of the bill to a scanning head 20. The bills thus introduced are automatically conveyed through the head 20 and are examined, as indicated in greater detail hereinafter to determine whether the bill is fit or unfit for continued circulation.

After examination, a bill is automatically conveyed from the scanning head 20 through an outlet slit 22 to a transport belt 24. The belt 24 and a guide 23 convey an examined bill through a first "doubles" directional gate station 25, the function of which is described hereinafter, and then to a second fit/unfit directional gate station 26. The gate station 26 includes a solenoid 28 which actuates a plurality of directional guide fingers 32a and 32b. When aa bill which is being transported to the station 26 has been determined by the apparatus to be fit, the solenoid 28 is energized thereby actuating the fingers 32 and causing the direction of transport of the bill to be directed over a first course indicated by the solid arrows. A bill is conveyed over segments of a first course by a belt transport 34 and guide 35, a belt transport 36 and guide 37, belt transports 38 and 39 which provide lateral translation in the transport of a bill with respect to its initial direction of motion along the belt 24, and a transport belt 40 and guide 41 which transport and deposit a fit bill 17 in an upper stacker of bin 42.

When a bill being examined has been determined to be unfit for continued circulation, the solenoid 28 remains in a deenergized state and an unfit bill is transported from the gate station 26 over a second course, indicated by the dashed arrows, through a demonetizing station 44, through a postprint detection station 45, and to an upper stacker or bin 46. A bill is transported over segments of this second course by the transport belt 24 and guide 35 and by the transport belt 24 and a transport belt 47. At the demonetizing station 44, the bill is conveyed between a pair of printing rollers which print a demonetizing marking in ink on the bill. The bill is then examined at the detection station 45 for the presence or absence of a demonetizing marking. The absence of a demonetizing marking indicates a malfunction at the demonetizing station 44 and operation of the apparatus is automatically interrupted. However, when a demonetizing marking is determined to be present on the bill, the bill is transported to and deposited in the upper unfit bill stacker 46. During operation of the apparatus, the transport belts are continuously driven and the motion of a bill over the first or second course, and through the various stations, is continuous.

In order to provide an accounting and a verification of the number of bills which are removed from the strap 18, and which are fed to the apparatus, the scanning head 20 and an associated electrical circuit means provide a count, and a display of the count, of those bills which are transported through the head and which are determined not to be double or overlapping. In addition, a counter 48 is provided for counting the number of unfit bills which are transported to and deposited in the upper stacker 46 and a counter 49 is provided for counting the number of fit bills which are transported to and deposited in the upper stacker 42. A visual display indicative of the number of fit bills collected in the upper stacker 42 and unfit bills collected in the upper stacker 46 during the sorting of a strap is thereby provided. When a strap 18 is depleted, and a number of bills equal to a predetermined strap number has introduced into the scanning head 20, the apparatus will automatically transfer into a stop mode. At this time, the operator can, from the displayed counts, verify the number of bills in the strap. When the number of bills entered into the scanning head 20 is less than the predetermined number of bills in a strap, an error of security breach is indicated, and the operation of the machine can be terminated until the reason for the discrepancy is determined.

Upon verification, the operation of the apparatus is reinitiated by the operator through actuation of a start switch, which transfers the apparatus into an operating mode. At this time, those bills in the upper stackers 42 and 46 are automatically transferred to lower stackers 52 and 54 respectively by the opening of lower doors in each of the upper stackers. The upper stackers which are then emptied are conditioned to receive fit and unfit bills from a succeeding strap.

The apparatus retains tallies of the number of bills which have been sorted into each of the upper fit and unfit bill stackers 42 and 46, respectively. When this tally of fit or unfit bills is equal to a predetermined strap quantity, a separator card 56 is automatically transferred into an upper stacker 42 or 46. The separator cards 56 are stored in card bins 58 and 60, respectively. A separating card will be transferred to the lower stackers from the upper stackers along with the bills contained therein, upon completion and verification of a strap. After the lower stacker units are filled to capacity, an indication is provided and the unfit bills can be removed and bound into straps for subsequent destruction.

The introduction of bills, under certain conditions, will result in a light transmissivity which is substantially lower than the transmissivity of an unfit bill. This condition occurs for example, when one bill adheres to another and these "doubles" are fed to the scanner head 20. This condition can also occur when bills which are fed seriatim, are fed at a rate which causes them to overlap at the examination station. It is desirable that these bills be inhibited from traversing the first and second courses, and that they be removed from the apparatus and be delivered to a station at which the operator can examine them and decide as to the feasibility of reinsertion. For example, bills which are introduced in an overlapping manner and bills which are lightly adhering one to the other can be separated and be reintroduced, while bills which cannot be readily separated or bills which are severely soiled can be removed for individual treatment. The apparatus is adapted for sensing when doubles have been introduced into the machine, for diverting their passage prior to reaching the fit/unfit gate station 26, and for returning these bills to a return shelf 62 at the operators station. Those bills which exhibit a substantially low transmissivity conforming to a predetermined doubles reference level (which level is substantially lower than a reference level for distinguishing fit from unfit bills) are detected by the apparatus upon examination by the scanner head 20. A double bill is transported to the double gate station 25 at which location solenoid 64 is energized. The energized solenoid actuates a plurality of direction diverting fingers 66a and 66b. As a double bill is transported from the slot 22 by the belt 24 and guide 23, its direction of transport is altered by the fingers 66a which cause it it travel over a course indicated by the curved dashed line between a return roll 68 and guide 69 to the return tray 62. The apparatus inhibits entry of a count into the strap counter and strap count verification is not affected. Those returned double bills which cannot be re-entered because of their condition, are available to the operator for accounting when verifying the total number of bills derived from a strap 18.

It is desirable, for security reasons, that the apparatus recognize when a bill which is demonetized is fed to the apparatus. The scanner head 20 includes a detection means for sensing the presence of a demonitizing marking on a bill at the examination station. When this marking is detected, the apparatus is automatically transferred into a stop, locked mode and the apparatus cannot be restarted without the actuation of a keylock, the key for which is maintained under the control a supervisory operator.

In addition to United States currency, the Federal Reserve Banks are required at times to process other special forms of value paper such as Treasury Notes, Food Stamps, etc. While processing of this value paper generally does not require separation based on fitness, the paper is handled in straps and generally requires counting, verification, forming into straps and at times "devalueing". The apparatus illustrated in FIG. 1 includes a second scanning head 70 to which this special paper is fed for processing. The scanning head 70, for value paper, operates as a strap counter detector. After the paper is examined, it is conveyed from an exit aperture 71 and is transported by a belt 72 over a course indicates by solid arrows to an upper stacker 76. For purposes of simplifying the drawing, the additional belt and guides for transporting the paper over the course is not illustrated but it is understood that guides equivalent to the guides 23, 35 and 69, and a transport belt equivalent to the belt 47 which are employed with belt 24, are similarly employed with the transport belt 72. A counter detector 77 is provided for sensing paper which is transported to, and deposited in, the upper stacker 76. When the transmissivity of the document is less than the pre-established doubles reference, a double gate station solenoid 78 is energized for actuating direction diverting fingers 80 and diverting the transport of the paper to a return tray 77. Those documents which are introduced into the upper stacker 76 are transferred to a lower stacker 78, when a number of value papers equal to the number in a desired strap have been deposited in the upper stacker. In addition, a separator card 56 from separator bin 80 is deposited in the upper stacker 26 when a number of papers equal to the strap number have been sorted and is transferred with the value paper in the upper stacker to the lower stacker 78. A doubles transport arrangement, which again for the purpose of simplifying FIG. 1 is not illustrated, is understood to include a roller, guide, and a return tray equivalent to the roller 68 and guide 69 and return tray 62.

In addition to that portion of the apparatus which has been described generally thusfar with respect to FIG. 1, there is also provided circuit means for causing various machine operations in response to the information contained in signals received from the scanner and the various detectors. The circuit means, which is described in greater detail hereinafter, operates to effect operation of the doubles gate station 25, operation of the fit or unfit gate at station 26, operation of the strap card separator, transfer of the bills in an upper stacker to a lower stacker, and causes the machine to transfer from an operating mode to a stop mode. The change of modes is effected when a number of bills equal to a predetermined number of bills in a strap has been introduced and sorted by the apparatus, when a malfunction in the demonetizer is detected, or when a demonetized bill is introduced into the apparatus.

Referring now to FIG. 2, the generalized system block diagram detailing the functional interrelationship of the electronic components of the apparatus is indicated. The major counting system is illustrated as block 110 which provides a totalized count of the strap input and display therefor. Strap size is provided as an input to the strap input counter along the line 112 from the strap size input device 114. Adjustment of the strap size input device 114 in accordance with the number of bills in a particular strap thereby indicates to the strap input counter 110 the total number of bills to be expected as a strap input condition. Activation of the strap input counter is in response to bills placed along the regular bill input line 116 or the special bill input line 118 through the entry detection and logic circuit 120. Sensing of the various entry conditions in accordance with the entrance of the bills along the input lines 116 and 118 will provide the appropriate decision within the entry detection logic circuit 120 for providing indication as to whether the bill is to be rejected. If a regular input bill is not rejected, it will be further classified as a fit or unfit bill. If the bill is to be rejected, for example as a double, an appropriate signal is provided along the line 122 to the double gate and solenoid control circuitry 124 which in turn operates the appropriate doubles gate for regular or special double conditions as illustrated in FIG. 1. In addition, rejection of a bill will also be placed along the line 126 for inhibiting the strap input count and display 110. Thus, a rejected bill is not counted as an appropriate input on the strap input counter 110.

If the bill provided along the regular input 116 is categorized as not falling within one of the doubles gate activation categories, the bill is then examined for quality. If the bill is determined to be unfit, an appropriate logic signal is provided along the line 128 to the fit-unfit solenoid control 130 which, in accordance with the detected quality condition of the bill as in its unfit state, provides an appropriate control to the fit-unfit control gate illustrated in FIG. 1. As each appropriate selection is made, the bills are stacked in their appropriate stackers. A regular bill is stacked in either fit or unfit stacks, while a special bill is merely stacked without quality analysis.

Sensors positioned at each appropriate upper stack provide a signal corresponding to inputting of each stacked bill. Thus, the appearance of a fit bill at the fit bill upper stacker will provide a logic signal along the line 132, an unfit stacked bill will provide a logic signal along the line 134 and a special stacked bill will provide a logic signal along the line 136.

The stack signals are fed to a stacker detection logic circuit 138 which provides appropriate output signals along the output lines 140 to a counter unit 142 which consists of individual counters 142A, 142B, and 142C, for counting each fit, unfit, and special bill as they are collected. In accordance with the predetermined strap size information provided from the strap size unit 114 along line 144 to the counter display logic unit 142, the separator control 146 will be activated in accordance with the completion of a strap count in any one of the fit, unfit, or special counters. The appropriate separator control illustrated generally as 146 will thus be activated in accordance with achievement of a strap count in any of the counter units described generally in the block 142, causing activation of the separator mechanism inserting a separator card into the proper upper stacker as was described in conjunction with FIG. 1.

Completion of the predetermined strap input count in the counter 110 will provide an appropriate logic signal along the line 147 indicating a strap full condition to a system control unit 148. The effect of the strap full signal along the line 147 to the system control unit 148 will result in stopping further bill feed into the machine. This machine feed shut down is accomplished by an appropriate output signal provided along the line 154 to a machine control operating mechanism 156. Mechanism 156 provides the input drive stop feature necessary for the accomplishment of this function. Reactivation of the machine by activation of the full input signal to the system control unit 148 will provide an output signal along the line 150 to the stacker door control 152. The function of the stacker door control will be, as described in FIG. 1, to open the doors on each of the upper stackers described in FIG. 1 and permit the bills thus far accumulated in the stackers to drop into the lower stacker. The FULL 151 will also reactivate the feed control mechanism block 156.

Since the strap size data from unit 114 has also been entered into the block 142, the separator control 146 will cause the appropriate separator card to drop into the appropriate upper stacker when a full strap size is achieved in any of the fit, unfit or special stacker units, respectively.

As was set forth above, the machine includes a demonitization function. It is thus important to monitor two conditions: first, whether a demonetized bill is being scanned (pre print detection) and; second, whether the printing equipment is working properly (post print). In the first condition, a signal from the pre-print scanner is analyzed to determine whether an entered bill has be demonetized. If it has, a logic signal applied along line 158 to the system control 148 activates a shut down sequence to machine control unit 156. This will disable both input feed drive and main motor drives, shutting down the machine. An alarm light or other indication may also be provided. In the second condition, a signal from the post-print scanner is analyzed to determine if the bill has been properly demonetized. If it has not, a logic signal is applied along line 160 to the system control 148 to activate a shut down sequence to machine control unit 156. This will first disable the input feed drive and, after a delay sufficient to allow previously demonetized bills to exit the machine, shut down the main motor drive.

Reactivation of the machine after a pre-print or post-print shut down is effected by depressing the RESTART control 153 which resets the system control 148 and permits reactivation.

As was set forth above, activation of the doubles gate will result in rejection of a bill. The options available to the operator after rejection, include reinserting of the bill, in which event the machine merely functions as it did in the previous cycle, or activating a machine override. The purpose of the machine override will be to automatically demonetize a bill without the improper entry or quality decision features described above. Thus, activation of a doubles override 164 by means of appropriate input 162 provides an appropriate signal along the line 166 to both clamp the doubles gate 124 so as not to reject the bill, and the fit/unfit gate solenoid control 130 so as to pass the bill through the demonetizing section described in FIG. 1. The operation of the logic override 164 in this doubles mode is set by the input 162, and triggered upon receipt of a signal indicating that the now entered bill has reached the proper position within the sensing head. The trigger signal is provided from the entry condition detection circuit 120 along the line 168. The operation can only be accomplished once for each double override. Resetting of the override entry bill is fed into the unfit stacker detector as indicated by the appropriate signal then applied along line 134 to the stacker detection logic 138 and along the output line 170 to the override logic 164.

A supplemental override operation is provided by means of the override input 172. The function of the override input 172 is to demonetize the special bills. In this instance, activation of 172 will provide an appropriate signal to the override logic 164 for again deactivating the doubles gate and clamping the fit/unfit solenoid control 130 to its unfit condition. In this mode, however, accumulation of demonetized specials is accomplished in the unfit stacker and operates continuously without reset until the specials override function 172 is again activated, thereby placing the override logic 164 in its initial condition.

The demonetization of special bills is accomplished after collection of specials in the specials stacker. Demonetization of specials is effected by re-feeding stacked specials into the Regular input, again with the doubles gate clamped to prevent rejection, and with the fit/unfit gate clamped to the unfit position. To prevent erroneous counts, the override logic will provide an inhibit signal along line 174 to the strap input counter 110 upon activation of the specials override function 172. This will inhibit recounting of specials for demonetization.

Figure 3A:
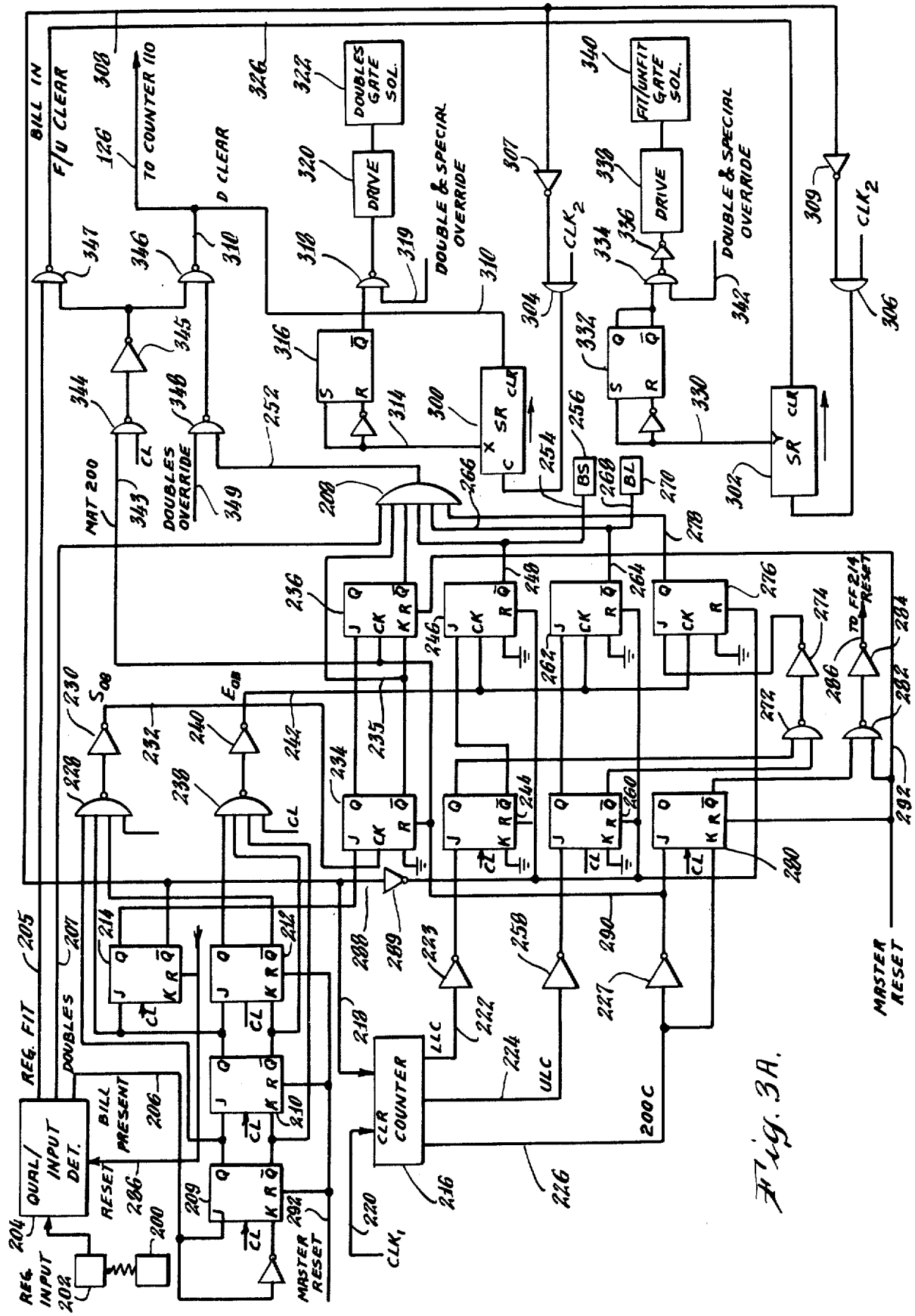
FIG. 3A is a detail of the input and control logic.

Referring to FIGS. 3A and 3B detail logic circuitry for the input function is described. The input logic per-forms two functions, entry conditions rejection and quality determination. For entry condition analyses, the input logic acts, to activate the doubles gate, in accordance with certain undesired conditions. These conditions include (a) detecting a double within the scan head itself, (b) detecting whether a bill is too long, (c) detecting whether a bill is too short, and (d) detecting whether two bills have been fed too closely to each other. In any of these situations, the doubles gate is activated and the bill is rejected. In the case of bills too close to each other, both forward and rear bills are rejected. It is noted that both the regular and special entry condition detection, logic and rejection mechanism are precisely the same. The only distinction between the regular and special input systems resides in the quality detection scheme, lacking in the special input system. Thus, FIG. 3A illustrates the entire logic, selection and decision making function for the regular input scheme, it being understood that the special input circuits are the same with the exception of the absence of quality detection and selection. With specific regard to FIG. 3A and the timing diagram, FIG. 3B, the regular input logic signal is provided by means of fluorescent light source 200 applying appropriate signals to the detector 202, the signals therefrom fed in turn to a quality and input detection circuit 204, set forth in greater detail below. It will be further understood that this circuitry may also be duplicated in connection with the special detection head, with the quality detection position thereof omitted or ignored. A clock source, CLK, not shown, supplies clock pulsing CL at various points within the logic. The detection circuit 204 provides a quality indication along line 205, a BILL PRESENT along line 206 and a doubles indication along line 207 to gate 208. For logic purposes, a BILL PRESENT is a logical one, a FIT is a logic 1, and the presence of a DOUBLE a logic 0. The detection circuit 204 determines the presence of a bill and applies a high condition BILL PRESENT signal along the line 206 to the JK flip-flop 209, and on the appearance of the first clock pulse thereafter causing the Q output of the flip-flop 209 to go high. The term "high" will be understood to include the meaning of a logical "1", and "low", logical "0". It will be understood that reverse logic may also be employed. Upon the appearance of the next clock pulse, the Q output of the flip-flop 210 having a high state on its J input will also go high, thereby applying a high signal from the Q output of the flip-flop 201 to the J input of the flip-flops 212 and 214. On the third clock pulse, the flip-flops 212 and 214 will each have their respective Q outputs go high, and their $\overline{Q}$ outputs go low.

A counter 216 is provided which is maintained in a normally disabled condition when a high signal is placed on its clear input CLR along the line 218 from the $\overline{Q}$ output of flip-flop 314. When the flip-flop 214 is set by the third clock pulse as described above, the Q output of flip-flop 214 will go low, thereby enabling the counter 216 which will begin counting clock pulses introduced along the line 220. The counter 216 is designed to establish in conventional manner, output conditions corresponding to predetermined counts.

The entry condition logic scheme of the present invention employs the use of pulse sequence timing over a fixed duration to determine the minimum length, maximum length, and inter-bill spacing decision features described above. By way of example, the logic of the present invention establishes a pulse count of 150 pulses representing an approximately length of an average bill, 6⅛ inches. A window may be established on either side of the average pulse position to define a gate length condition for a correct range of bill lengths. Again by way of example, a gate length may be established anywhere between a lower limit count of 147 pulses and an upper limit count of 153 pulses representing the minimum and maximum desirable length of a bill to be accepted by the machine. Bills passing in less time than the minimum or more time than the maximum are to be rejected. Along the same lines, an inter-bill spacing definition can be established utilizing the same count frame. Thus, taking into account the timing and speed of the feed mechanisms and scan operation, a condition of N machine pulses is defined from the first sensed bill until the machine is ready to receive another bill. In the example given, N is set equal to 200 machine pulses or about 8 inches in terms of feed distance. Since a bill averages about 6 ⅛ inches, by establishing a 200 pulse spacing as a minimum cycle between bills, an inter-bill spacing definition of about 2 inches may be established. Obviously, other interbill spacing criteria may be employed, and the use of 200 is illustrative only and not intended to be limiting.

Referring again to FIG. 3A, the counter 216 provides the pre-set count level signals. An output along the line 222 thus corresponds to the lower limit count, an output along the line 224 corresponds to the upper limit count and an output along the line 226 corresponds to the 200 count.

The Q outputs of the flip-flop 209 and 210 and the $\overline{Q}$ output of flip-flop 212 are connected to a futher gate 228. At the time of the activation of the third clock pulse, which is also connected to gate 228, all of the inputs to the gate 228 are high, thereby resulting in a low output from the gate 228, which is in turn inverted in the inverter 230 providing a high output along the line 232. This high output along the line 232 represents the start of bill SOB pulse, shown in the timing diagram FIG. 3A.

When the bill ends, the BILL PRESENT signal on line 206 goes low, signifying the bill is no longer present. At the next clock pulse, the flip-flop 208 is rest. Thus, after a further three pulse delay, (FIG. 3b), the gate 238 is activated with three high inputs from the $\overline{Q}$ side of flip-flops 209 and 210, and the Q side of flip-flop 212, and the next following clock pulse. This causes a low condition at the output of the gate 238. The low is inverted in the inverter 240 and a high signal, representing an end of bill pulse EOB, appears along the line 242. If the EOB pulse occurs before the lower limit count has appeared along the line 222, the flip-flop 244 will not have been placed in its set condition, meaning the $\overline{Q}$ output of the flip-flop 244 will be high thus conditioning the J input of the flip-flop 246. The appearance of the EOB pulse along the line 242 to the clock input of the flip-flop 246 will thus cause the flip-flop 246 to become set, thereby placing a low output along the Q line 248 of the flip-flop 246. The low output will proceed along the line 250 to the NAND gate 208. The low input to the NAND gate 208 will result in high input along the output line 252 of the NAND gate 208. The operation of the effect of the output along the line 252 will be described in further detail below; however, suffice it to say at this point that the effect of the high NAND gate 208 output signal in any event will be to reject a bill by allowing the activation of the doubles gate, in this example for a bill short condition. In addition, the output line 248 of the flip-flop 246 can also be coupled along the line 254 to a bill short indicator 256. If the end of bill pulse had arrived after setting the flip-flip 244, meaning the minimum bill length was surpassed, the flip-flop 246 would not have been preconditioned and thus would not have been set to provide the bill short indication.

The ultimate length of the bill length gate is set by the ultimate length count appearing along the line 224. More specifically, a low condition along the line 224 indicates achievement of the ultimate length count, the low being converted into a high condition through the inverter 258 for driving the flip-flop 260 into its set condition thereby placing a high condition to the flip-flop 262. Appearance of the end of bill pulse along the line 242 after the flip-flop 262 has been conditioned with a high at its J input results in the $\overline{Q}$ of flip-flop 262 state going low. Appearance of the low signal along the line 262 will be passed along the line 266 and to the NAND gate 208, where it will result in a high condition along the line 252. Effect of this high condition, as described above, will be to activate the doubles gate. In addition, the signal along the line 264 may be fed along the line 268 to a bill long indicating device 270, thereby providing the operator with an indication that the bill was rejected for reasons of undue length. It is again noted that had the end of bill pulse appearing along the line 242 occurred prior to the time the ultimate length count signal appeared along the line 224, the flip-flop 262 would not have been pre-conditioned and the $\overline{Q}$ state would have remained high thus blocking a rejection condition.

The bill length long and short indications are also provided by a backup logic system including the gate 272 coupled to the high output of the flip-flop 244 and the low output of the flip-flop 260 respectively. Thus, the gate 272 defines the window condition representative of the bill length gate. The output of the gate 272 through the inverter 274 is used to condition the flip-flop 276 to respond to any end of bill pulses received during the window condition defined by the minimum and ultimate length. Thus, and end of bill pulse applied along the line 242 to the clock input of the flip-flop 276 during the period before the beginning or after the end of the bill length gate keep flip-flop 276 in reset state, providing a low signal along the line 278 which will be applied in turn to the NAND gate 208. The low condition will result in a high condition along the output line 252 indicating that a bill which is either beyond maximum or below the minimum length has been detected.

The output line 226 of the counter 216 goes low upon achieving a count indicating the minimum desired inter-bill spacing, in this example, a 200 count. Prior to the time a 200 count is achieved, the flip-flop 280 is in a reset condition with the $\overline{Q}$ output high. When the 200 count condition is received along the line 226, the flip-flop 280 goes into its set condition, and the output $\overline{Q}$ of the flip-flop 280 goes low. The low output is converted by the NAND gate 282 into a high and is inverted in the inverter 284 to a low condition. The low condition is fed back to the reset input of the flipflop 214, thereby ending the cycle by driving the flip-flop 214 to its reset condition. The reset signal is also applied along the line 286 to the quality and input detection circuit 204 for reasons which will be described in further detail below with reference to that circuit.

The resetting of the flip-flop 214 causes the Q output of the flip-flop 214 to go high, thereby clearing the counter 216 along the line 218. A high condition on the clear input of the counter 216 also inhibits the futher count of clock pulses appearing along the line 220 as was described above. The high $\overline{Q}$ signal from flip-flop 214 is also applied along the line 288 through inverter 289, to the reset inputs of each of the flip-flops 234, 244, 260, 246, 262 and 276 for resetting each of these flip-flops, which are reset by a low input condition at the R inputs. If, however, the system is in a condition where an end of bill pulse has already appeared along line 242 and a new start of bill pulse is applied along the line 232 prior to the 200 count along line 226 being achieved, it will be apparent that the flip-flop 234 will be set to respond to the new start of bill pulse appearing along the line 232 when applied to its clock input by changing states, rendering its $\overline{Q}$ condition low. This low $\overline{Q}$ condition of flip-flop 234 will be applied to the NAND gate 208 along line 235 which will apply a signal to the line 252 resulting in a reject by activation of the doubles gate. It will be recalled that prior to the end of the 200 count, the Q output of the flip-flop 214 is high, applying a high to the J input of flip-flop 234. Thus, appearance of the start of bill pulse along the line 232, and coupled to the clock input of the flip-flop 234, will cause the output of the flip-flop 234 to go high, thereby causing the flip-flop 236 to receive a high on its J input. The flip-flop 236 will remain, however in its reset position with its Q output high until a high is received on its clock input. Since the flip-flop 236, which is coupled to the flip-flop 234, will have its J-K inputs set to the state that will enable the 200 count signal appearing along the line 290 to place flip-flop 236 in its set condition, the flip-flop 236 thus applies a low condition along its $\overline{Q}$ output into the NAND gate 208. Therefore, as a result of the action of the flip-flop 234, the first bill be rejected, and as a result of the action of the flip-flop 236, the second bill which has been following too closely to the first will also be rejected. Flip-flop 234 will be reset by the 200 count as described previously thus setting the J-K inputs to the flip-flop 236 to the state which will enable the next 200 count along line 290 to place it again in reset condition.

Referring again to FIG. 3A, the activation logic of the mechanical gating operation is built around the operation of a shift register, operable to shift bits along a sequence of stages in known manner, in accordance with a predetermined clock sequence. As shown in FIG. 3A, the first shift register 300 corresponds to the doubles solenoid gate selection circuitry, and a second shift register 302 corresponds to the fit/unfit gate solenoid gate selection circuitry. In terms of machine feed sequence operation, it is the doubles selection which is made final, and then the quality selection. Each shift register includes a gate input 304 and 306 respectively for gating in a clock signal identified as CLK2. The rate of the clock signal is at a slower rate than the clock pulses described above in connection with the timing frame, and by way of example, this example may consist of a rate of 1 clock pulse per half inch of linear feed. The timing of this clock pulse is to permit the appropriate fit or unfit gate or doubles gate selection to be made when the bills have reached a position in the feed line such that activation of the gates will be at the proper time to reject the bills. Generally speaking, the operation utilizes deactivation of a present input condition to prevent rejection, for the doubles gate, and unfit selection, for the fit/unfit gate. In each case, the shift registers each shift an input pulse for a predetermined time. If the time is achieved without the shift register being cleared, the appropriate gate activation occurs. For the doubles gate, rejection occurs, and for the fit/unfit gate, an unfit selection is made. If the other choice is made, the register is cleared prior to the predetermined time period.

Referring again to FIG. 3A, gates 304 and 306 are each activated by means of a BILL IN low signal which may be derived from the $\bar{Q}$ output of the flip-flop 214, and which is low for a 200 count as explained above. Upon the opening of the respective gates 304 and 306, the shift registers 300 and 302 each begin to shift the BILL IN pulse along the length of the respective shift registers, in the direction of the arrow, at a rate in accordance with the clock pulse rate CLK2.

Regarding the gate logic, more specifically, the activation of the doubles gate shift register 300 begins the doubles gate timing cycle. Activation occurs by shifting the logical ones into the shift register 300 when the gate 304 is uninhibited. This occurs when a low condition representing BILL IN is applied along line 30B to the inverter 307. The low is thus applied as a high to the gate 304 and thereby allows the shift register 300 to shift logic ones therealong, in the direction of the arrow, until a stage, designated as X, is reached.

Similarly, activation of the fit/unfit gate shift register 302 begins the quality control timing cycle. Activation occurs by shifting the logical ones into the shift register 302 when the gate 306 is uninhibited. This occurs when the low condition representing BILL IN is applied along line 308 to the inverter 309. The low is thus applied as a high to the gate 306 and thereby allows the shift register 302 to shift logic ones therealong, in the direction of the arrow, until a stage designated as Y, is reached.

Referring again to the doubles timing, the shift register 300 includes a clear input CLR. Assuming no clear pulse, in the form of a low condition, is applied along line 310 to clear the register 300, the shifted logic ones, upon reaching the stage X, will be applied along the line 314 to set the flip-flop 316. Since the Q side of the flip-flop 316 is connected to the NAND gate 318, a high condition is applied. The gate 318 also receives an input along line 319 and termed DOUBLE AND SPECIAL OVERRIDE, the function of which will be set forth in greater detail in the description of FIG. 6. The input 319 is normally in a high condition. The high output from the flip-flop 316 therefore results in a low output condition applied to the drive circuit 320. Since the drive circuit is designed to respond to a low condition, the application of the low condition will in turn activate the doubles gate 322 causing the doubles bill to be rejected. The doubles gate 322 corresponds to the regular bill solenoid mechanism 64, shown in FIG. 1. The special bill solenoid mechanism 78 is activated in precisely the same manner by corresponding logic circuitry, now shown for ease of illustration.

The use of the override line 319 is designed to clamp the doubles gate 322 to its acceptance position. Thus, applying a low condition along line 319 will clamp the output of the NAND gate 319 to a high condition, regardless of the condition of the other input to the gate 319. The high condition will inhibit the driver 320 and thus prevent switching of the doubles gate solenoid 322 from its acceptance position to its rejection position.

Referring to the fit/unfit timing, the shift register 302 also includes a clear input CLR. Assuming no clear pulse, in the form of a low condition, is applied along line 326 to clear the register 302, the shifted logic ones, upon reaching the stage Y, will be applied along the line 336 to set the flip-flop 332. Since the $\bar{Q}$ side of the flip-flop 332 is connected to NAND gate 334, a low condition is applied. The low condition results in high condition from the gate 334 which is inverted to a low by the inverter 336. The drive circuit 338, as before with respect to drive circuit 320, responds to a low condition for activating the fit/unfit gate 340, causing the same to switch from its acceptance or fit position to its unfit or rejection position, causing the bill to be fed to the printer (demonitizing) mechanism. The fit/unfit gate 340 corresponds to the quality gate solenoid 28, shown in FIG. 1.

It is noted, from FIG. 1, that the quality gate solenoid 28 is farther downstream from the doubles gate solenoid 64. Thus, the selection of the solenoid 64 must occur at a later point in time than the selection of the solenoid 28. This is accomplished by virtue of the X and Y stage selection in shift registers 300 and 302 respectively. The X stage is thus selected as a stage earlier in the stage sequence of shift register 300 than the Y stage in shift register 302. Since both shift registers are activated simultaneously, and shifted at the same rate by CLK2, the selection of the later Y accomplishes the timing differential. For example, the X stage may be 8 stages earlier than the Y stage. If the rate of shifting is one pulse per ½ inch of feed, then 4 inch distance elapses between successive selections. Other variations of timing sequence are of course possible, the foregoing being intended as exemplary only and not limiting.

The NAND gate 334 includes a further input 342 corresponding to the signal applied to the line 319, DOUBLES AND SPECIALS OVERRIDE. The override signal is a clamping signal, normally high. Should the clamping of the fit/unfit gate 340 in its unfit condition be desired, a low signal is applied along the line 342, clamping the output of gate 334 high. The output of gate 334 is inverted in inverter 336 to a low which in turn drives the drive circuitry 338. The drive 338 activates the fit/unfit gate 340, causing the solenoid 28 to go into its unfit condition, passing bills to the printer.

The operation of both doubles gate and quality gates are inhibited by clearing the respective shift registers 300 and 302. Inhibiting its accomplished by a sampling operation at a timed position. Since the sampling system must allow sufficient time for a bill to pass the scan head, 20 or 70, and be analyzed, the 200 count signal can be employed. Thus, referring to FIG. 3A, the 200 pulse signal is derived from the counter 216 and applied as a high signal from line 290 to line 343 to NAND gate 344, where it is gated with a clock pulse to provide a low signal of one clock pulse duration to the inverter 345. The resulting high signal is applied both to NAND gates 346 and 347.

The high inputs to gates 346 and 347 provide sampling pulses to determine the selection conditions. Referring first to the doubles selection, it was pointed out above that the presence of a high condition on the line 252 from the gate 208 indicated a double gate activation for rejection. Thus, to activate the doubles gate, it is necessary that the shift register 300 is not cleared while a high condition remains on line 310. Thus, if a rejection is to occur, line 252 is high, applying a high condition to one input of the NAND gate 348. The other input 349 to NAND gate 348 is a DOUBLE OVERRIDE condition which will be explained in further detail below. Normally, the double override condition on line 349 is high. Thus, a low signal results from gate 348 and is applied to gate 346, thus clamping the output of the gate 346 to a high condition and inhibiting the shift register 300 from being cleared, thereby resulting in activation of the doubles gate 322 when the shifted logic one signal reaches line 314 at stage X as described above.

If no entry condition requiring bill rejection through the doubles gate occurs, the line 252 remains low, thus maintaining the output of gate 348 high. When the high sampling pulse is applied at the 200 count to the gate 346, the gate 346 passes the sampling pulse as a one clock pulse duration low signal on line 310, thereby clearing the shift register 300 and resetting the one logic conditions to zeroes, preventing activation via line 314.

The quality sampling test condition samples the other input to the gate 347. Thus, when the scan head 20 and quality detection circuit 204 determines that an unfit bill is present, a low input is provided along the REG FIT line to the gate 347. The low condition clamps the output of gate 347 to a high condition, thereby maintaining the high signal on line 326, preventing the shift register 302 from clearing, and resulting in activation of the quality gate 340. When the shifted logic one signal reaches line 330 at stage Y as described above.

If no quality factor rejecting the bill occurs, the line REG FIT is high. At the appearance of the sampling pulse from gate 345, a one clock duration low condition will be applied from gate 347 along line 326, clearing the shift register 302 and preventing activation of the fit/unfit gate 340, thereby holding the gate in its fit or acceptance condition.

In both regular and special bill inputs, it was noted above that the strap input counter 110 does not count a bill rejected for reasons of failure to meet an entry condition. The logic design shown in FIG. 3A permits this operation to occur by deriving a signal from line 310, corresponding to the doubles clear signal, for incrementing the counter 110. Since the strap input counter should count only acceptable bills, use of the clear signal along line 310 to increment counter 110 is appropriate. The incrementing signal is derived from line 310 and applied along line 126 to counter 110.

Referring now to FIG. 4A and 4B there is shown a detail of the stacker detection and counting logic. As was noted hereinabove, each of the upper stackers includes sensing means for providing an indication of the injected presence of the bill therein. These signals are representative of the presence of the bill in each of the upper stackers for fit, unfit or special bill accumulation. As is noted in connection with FIG. 2, the indication of a fit or special bill is provided along the respective input lines 132, 134 or 136. The input lines are coupled to detection logic 132A, 134A and 136 respectively.

Referring now in greater detail to the fit stacker detection logic 132A, the input signal applied along the line 132 is applied to the inverter trigger 350. The inverter trigger 350 will switch to low output condition 350A at $T_1$ of proper shape and magnitude when the leading edge of a bill passes through the fit stack detector located at the leading edge of the fit upper stacker as described above, and remains in this condition for as long as the bill is present. This signal is inverted in inverter 352 to a high signal which is applied at the input of the gate 354. Assuming for the moment the other input of the gate 354 to also be high during the application of the stacker detection signal from the inverter 352, the leading edge of the resulting low output signal 354A from the gate 354 will provide a negative going differentiated output spike 356A from the differentiator 356 which is applied to a time delay trigger 358. The time delay trigger 358 is designed to respond only to negative going spikes to provide a gating signal 358A immediately upon excitation by an input thereto, and is further designed to maintain the gating signal 358A for a specific time. The trigger 358 may be a conventional monostable multivibrator. The signal 358A sets the synchronizer delay 360, which in turn synchronizes the system with a clock signal supplied along the line 363 and to provide a three pulse delay in order to synchronize the stacker count with the input count in accordance with the three pulse delay provided by flip-flops 208, 210 and 212 described in connection with FIG. 3A. The synchronizer can in fact be constructed of sequential flip-flops acting sequentially, as was described in FIG. 3A, and as shown as including JK flip-flops 361 and 362.

In operation, the function of the time delay trigger 358 is to provide an additional count pulse to the flip-flop 364 in the event that the passage of bills through the feed mechanism results in 2 bills being so closely overlapping as they are applied into the upper stacker that only a single count pulse is applied along the line 132. Since verification is an important feature of the present invention, some means must be provided in order to insure that two counts are provided where two bills are placed into the upper stacker even though the upper stacker detection only detects a single bill because of a partial overlap between bills. By way of example, an average bill can have an average detectable length of 145 milliseconds, the delay period placed into the time delay trigger 358 is of a time sufficient for insuring that a second pulse will pass through for counting purposes, if that average length is exceeded. By way of example, the present invention may utilize a time delay of 155 milliseconds.

The setting of the first flip-flop 361 by the output gate 358A of the trigger causes the output signal 361A of flip-flop 351 to go high after the next clock pulse, setting the next flip-flop 362. The flip-flop 362 output signal 362A goes high after the next clock pulse, and finally, the flip-flop 364 output 364A goes high after the third clock pulse. Just prior to this point, however, the gate 365, which is tied to the Q outputs of flip-flops 361 and 362, and to the $\bar{Q}$ output of flip-flop 364, is set to pass the third clock pulse as output signal 365A. The output signal 365A is passed along line 366 to increment the fit counter register 368, indicating a bill received at the fit bill upper stacker.

After the delay time of the trigger 358, the trigger signal 358A will return to its low condition. As a result, as 3 clock pulses successively are applied, each flip-flop 361, 362 and 364 will return to reset conditions. Just prior to flip-flop 364 going low, however, the third clock pulse after the gate 358A goes low will pass the gate 367, as signal 367A, the gate 367 being previously conditioned by the Q outputs of flip-flop 361, 362, the $\bar{Q}$ output of flip-flop 364. The output of the gate 367 forms the other input of the gate 354.

At the moment $T_3$ when the pulse 367A is applied to the gate 354, two events are possible. First, a bill of proper duration has entered the stacker, leaving the sensor area, and no bill is present. In this case, the output along line 132 is low, and the other input to the gate 354 is low, clamping the output of the gate 354 high.

Thus, the change of state caused by the pulse applied from gate 367 will have no effect on the output of the gate 354. It should be noted that at the end of a normal bill ($T_2$) previously applied to the gate 354 created a positive going spike at the output of the differentiator 356. This spike, however, has no effect on the time delay trigger which is conditioned to respond only to negative going spikes.

In the second condition, however, shown in dotted line in FIG. 4B, if the detected bill time exceeds the trigger delay period of 155 ms. due to some condition at the stacker input, such as a partial overlapping bill, a further count increment is required. In this case, the output of the trigger 350 is still low, and the input to gate 354 is high. Now the low going pulse at $T_3$ from gate 367 will pass the gate 354 and provide a high pulse 354B. The pulse 354B will result in a positive and negative spike 356B from the differentiator 356. As noted above, the trigger 358 will respond to the negative going portion of the spike 356B to reinitiate a trigger signal 358B, thereby reinitiating the flip-flop sequence 361, 362, 364 and a second incrementing pulse 365B, in the manner described above. Thus, a second incrementing signal is counted by the counter 368 under the overlap condition.

Operation of the separator solenoid in each of the fit, unfit and special stacker units is in accordance with comparison made between the stored strap count and the incremented stack count. Thus, a comparison circuit 374 provides a continuous comparison between the incremented count stored in the fit counter 368 and the previously stored strap count stored in a storage register 376. Upon determination that a coincidence of counts between the incremented fit counter 368 and the storage strap count register 376 is achieved, the comparator unit 374 supplies an activation signal to the separator solenoid activating the fit stacker separator as described in FIG. 1. The strap count is previously stored in the strap count register 376 by means of a count entered along the line 144 as was described above in connection with FIG. 2.

At the output of the fit count register 368, two display units may be provided. The first, a fit count display 380, accumulates each incremented fit count as it is received in the stacker associated with the fit bills. The fit count display 380 thus displays the number of bills accumulated into the upper stacker of the fit bill collection. This display is reset with each strap full count as determined by the strap input counter 110 applied along the line 147. Thus, the fit count display unit 380 may be relied upon for providing verification for each input strap of the number of bills in the input strap which were fed to the fit count upper stacker.

A second counter indicator or strap counter display 382 may also be provided. Fit strap counter display 382 can provide a continuous indication of the number of bills accumulated up to each total strap. Thus, for example, when the number of bills equal to a desired strap size has been accumulated in the fit stacker, the fit strap counter 382 will so indicate. The counter display 382 is reset by means of a pulse applied from the comparator 374 along the line 384 to the reset input of the fit strap counter display 382. Similarly, the fit count register 368 will also be reset by a signal from the compare unit 374. Cumulative count display units may also be provided for keeping track of the total number of bills, regardless of the reset conditions, accumulated in the fit stacker.

The logic and display mechanism 134A and 136A of the unfit stack count and the special stack count respectively operate in precisely the same manner as was described in conjunction with the fit stack logic 132A. In connection with the unfit stacker and special stacker, however, an additional output line is supplied along the lines 386 and 388 which are fed to the override logic for purposes which will be described further in conjunction with the override logic displayed in FIG. 6. In view of the similarlity in operation of the fit, unfit and special stacker logic, no further description will be provided herein of the unfit stacker and special stacker logic and separator solenoid operation. It should be noted, however, each of the unfit and special stacker units also include verification display counters operating in precisely the manner as described in conjunction with the fit stacker operation, as well as including activation of the separator solenoids in accordance with the unfit count as compared with the storage strap count and the special count as compared with the storage strap count, in the manner described in conjunction with the fit stacker operation. Verification of the strap input is provided by adding the counts displayed, at the end of a strap in accordance with the strap input counter 100 of displays 380, 390 and 392.

Figure 5:
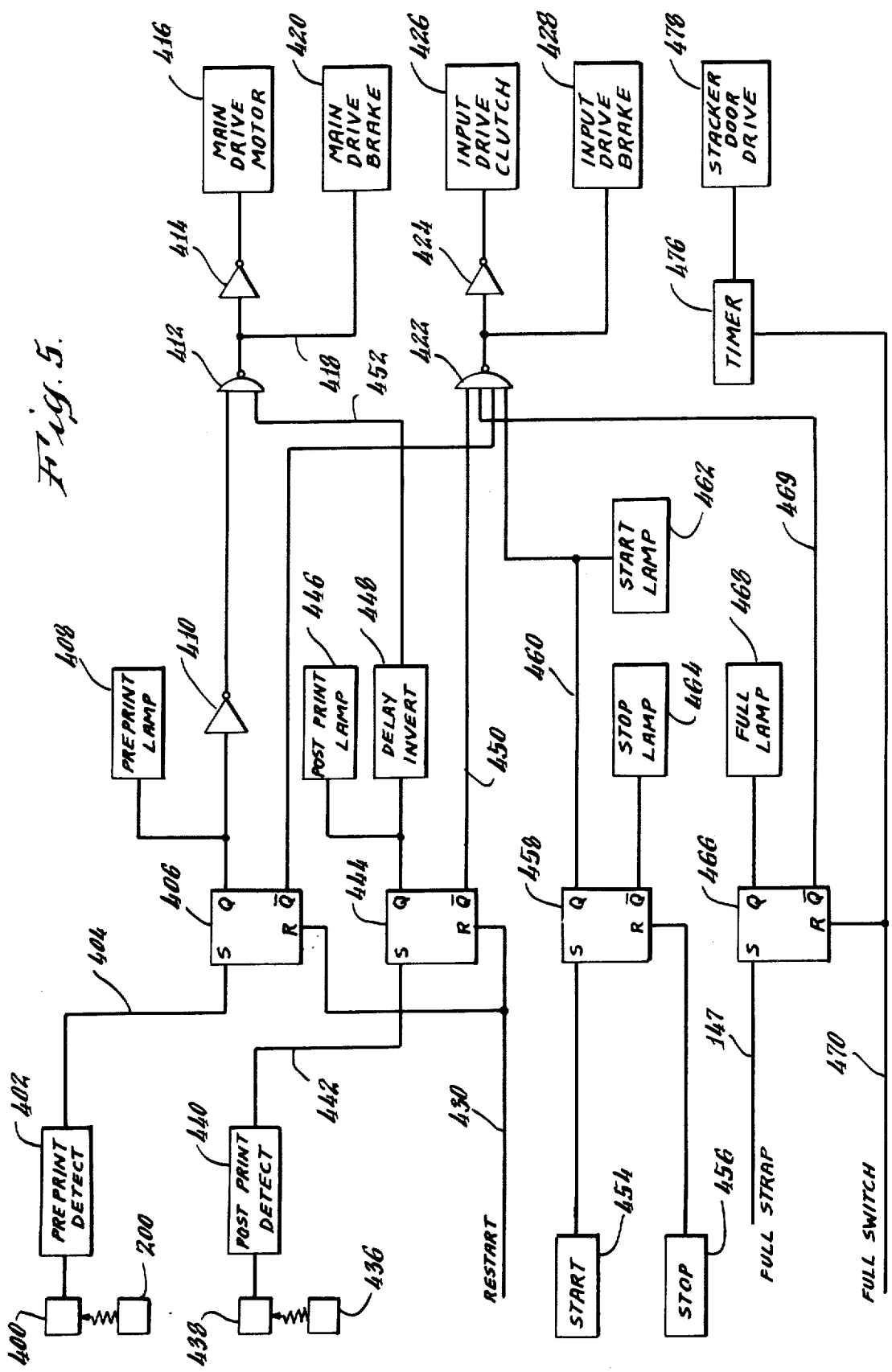
FIG. 5 is a detail of the preprint and postprint detection and control logic.

Referring to FIG. 5, a description of the system control logic 148 of FIG. 2 is set forth. The system control logic includes several functions. As part of the demonetization control, a preprint and postprint detection system is provided. In accordance therewith, the regular input scan head 20 includes a light source 200, the same light source utilized in conjuction with the fit input scan, and a preprint detector 400 responsive to optical images received from the scanned bill. A preprint detection circuit 402 analyzes the light received from the bill to determine whether a demonetized bill has been fed into the scan head unit. The preprint detection circuitry is described in further detail below. Should the preprint detection circuitry indicate that a demonetized bill has been fed into the scan head, an appropriate signal will be applied along the line 404 to a flip-flop 406. The signal on the line 404 will set the flip-flop 406, rendering its Q output high and lighting the preprint lamp 408 indicating to the operator that a preprinted bill has been fed into the scan head. At the same time, the high output on the Q side of the flip-flop 406 will be fed through an inverter 410 where it is converted to a low signal which is fed in turn to the NAND gate 412. The low input on the NAND gate 412 will produce a high output into the inverter 414 which will be converted into a low signal into the main drive motor control 416.

The main drive motor control 416 is designed to activate a shutdown in response to a low input thereto. Thus, the appearance of a low signal at the output of the inverter 414 will cause the main drive motor 416 to be disabled. At the same time, the high output from the NAND gate 412 will be applied along line 418 to the main drive brake 420. The main drive brake 420 is designed to respond to a high condition for applying a brake to the main drive. Thus, the high output condition of the NAND gate 412 will cause the main drive motor 416 to shut down and the main drive brake 420 to be applied. This will bring the main drive motor to a complete and immediate stop.

At the same time as the Q side of the flip-flop 406 is rendered high, the $\overline{Q}$ side of the flip-flop 406 has gone low. The appearance of the low condition on the $\overline{Q}$ side of the flip-flop 406 is applied to a NAND gate 422, resulting in a high output condition at the output side of the NAND gate 422 to the inverter 424. The low condition output from the inverter 424 is applied to the input drive clutch 426. The input drive clutch 426, controlling the connection between the motor and the driving means feeding the bill into the scan head, is designed to respond to a low condition thereto for disabling the clutch. At the same time, the high output signal from the NAND gate 422 is applied to the input drive brake 428. The input drive brake 428 is designed to respond to a high input for applying a brake to the input drive. Thus, the activation of a high from the NAND gate 422 simultaneously disables the input drive clutch and enables the input drive brake, thereby bringing the input feeding system to a halt.

After clearing the preprint situation, restarting of the equipment is accomplished by applying a low signal to the restart input 430 which, when applied to the reset input of flip-flop 406, places the flip-flop 406 in its initial condition. As a result, the Q side of the flip-flop 406 goes low thereby turning off preprint lamp 408 and reversing the signal conditions to the main drive motor, main drive brake, input drive clutch, and input drive brake circuitry so as to restore the motor drive condition to its driving state.

Postprint detection is also provided in order to determine proper operation of the demonitizing printer. To this end, optical means are utilized in the form of a light source 436 and a detector 438 positioned at the output of the demonetizing printer as is described above in connection with FIG. 1. A postprint detection circuit 440 responds to the signal applied along the line 160 (FIG. 2) from the postprint detector 438 in a manner similar to the preprint detection circuit 402. The operation of the preprint and postprint circuits is in fact essentially the same and is described in further detail below.

Detection of a postprint condition is opposite in effect to that of a preprint condition. That is, it is the failure of a postprint detection which gives rise to an activation along the line 442. The activation along the line 442 is applied to the set input of the flip-flop 444 which will have the effect of placing the Q output of the flip-flop 444 in a high condition, thereby lighting the postprint lamp 446 indicating to the operator that a postprint condition has occurred and that the demonetizing print system is not operating properly. The Q output of the flip-flop 444 is applied to a delay inverter circuit 448 and the $\bar{Q}$ output of the flip-flop 444 is applied along the line 450 to the NAND gate 422. The $\bar{Q}$ output of the flip-flop 444 has been rendered low by activation of the flip-flop 444 and places a low input condition on the NAND gate 422. The activation of the NAND gate 422 by a low condition at its input will create a high condition at its output giving rise to the same sequence of operations as is described above in connection with preprint. That is to say, the appearance of a low condition of the NAND gate 422 will act to disconnect the input drive clutch and apply the input drive brake 428, thereby rendering the input feed system to the scan head immediately inactive. In the case of a postprint detection, however, it is not desirable to immediately turn off the main drive sequence since there are still some bills left in the machine having previously and satisfactorily cleared the postprint and are on their way to the stackers. To allow sufficient time for these bills to be accumulated in the stacker, the delay circuit 448 applies a delay which in the case of the present machine configuration, is preset at 1½ seconds. After the delay of 1½ seconds, the delay circuit 448 will apply a low condition along its output line 452 to the NAND gate 412. The occurrence of a low condition of the input to the NAND gate 412 will create a high condition at the output of the NAND gate 412, giving rise to the same sequence of operation as was described above in connection with the preprint detection. That is to say, the main drive motor will be disconnected and the main drive brake 420 applied, thereby shutting down the main drive. When it is desired to restart the operation, the same restart mechanism 430 may be activated, which, in this case, applies the reset signal to the reset input of the flip-flop 444 thereby resetting the flip-flop and reversing the sequence of operation. Thus, activation of the restart after postprint detection will disconnect the postprint lamp and reactivate the driving mechanism.

A separate start and stop control manually activated by means of front panel push buttons can easily be provided within the framework of the circuitry described above. Thus, a start control 454 and a stop control 456 are each provided coupling signals along their respective output lines to the flip-flops 458. The start control is coupled to the set input of the flip-flop 458 and the stop control to the reset input of the flip-flop 458. Activation of the start control causes the flip-flop 458 to have a high condition placed along its output line 460, thereby lighting the start lamp 462 and applying high condition to the NAND gate 422. In the absence of any of the other predetermined input conditions applied to the NAND gate 422, a low output will be provided which will activate the input drive clutch and deactivate the input drive brake, thereby rendering the machine operational. In the stop condition, the stop signal is applied along the line coupled to the reset input of the flip-flop 458, rendering the $\bar{Q}$ output of the flip-flop 458 high and lighting the stop lamp 464. The low condition now present on the line 460 will also serve to immediately deactivate the input drive brake and activate the input drive clutch circuitry in accordance with the NAND gate conditions now present in the input of NAND gate 422.

One other function remains to be described in conjunction with FIG. 5, that which relates to the use of the full strap signal derived from the full strap counter 110, as illustrated in FIG. 2. As is described in conjunction with FIG. 2, the presence of a strap full signal derived from the strap input counter 110 is applied along the line 147 to the control circuitry for causing the input feed drive to stop, and thereby indicating to the operator that a strap full condition has been reached. It is then the operator function to depress the full strap button, (FIG. 2), thereby signifying to the system control that the upper stackers may now be emptied and its contents dropped into the associated lower stackers. This is accomplished as illustrated in FIG. 5 by means of a further flip-flop 466 responsive to the input signal, indicating a full strap condition, applied along line 147 to the set input of the flip-flop 466. As a result, the Q output of the flip-flop 466 will go high and light the FULL lamp 468. At the same time, the $\bar{Q}$ output of flip-flop 466 will go low, applying a low condition along line 469 to the NAND gate 422, thereby disabling the input feed system. The main drive is not disabled for this condition.

The operator may utilize this time to sign out a new currency strap, or otherwise verify the completion of an input strap. It is, of course, possible for the machine to automatically continue operation after completion of a strap; however, it has been found desirable for accounting and verification purposes to stop the feed condition at this point.

The operator, when ready to proceed, activates the FULL switch 470, thereby applying a low condition to the reset input of the flip-flop 466, thereby resetting the flip-flop 466 and extinguishing the FULL 468. At the same time, the low condition appearing along line 474 is inverted in inverter 475 and the resulting high applied to the timer 476 which in turn responds to the high and activates the stacker door drive 478 for opening the doors and allowing the accumulated bills to drop from the upper stacker to the lower stacker. It is preferred that the stacker door drive 478 activate a single mechanism for opening all of the doors simultaneously, although it is alternatively possible to open each individually.

Figure 6:
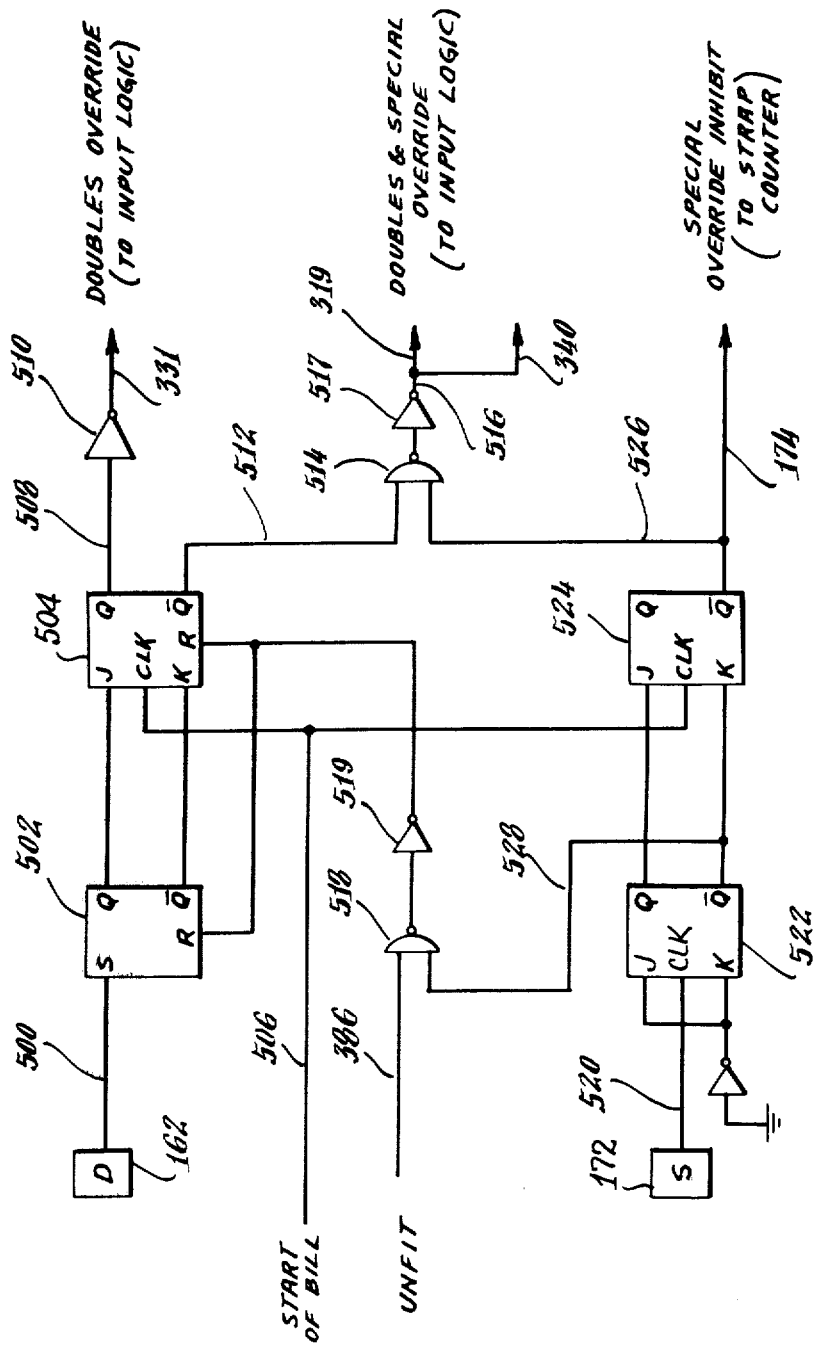
FIG. 6 is a detail of the override logic.

Referring now to FIG. 6, a detail of the override logic 164 shown in FIG. 2 is set forth. As was described in connection with FIG. 2, the function of the override circuit is to provide certain preset input conditions to the input logic in accordance with an override operation. In the case of an obviously unsatisfactory bill which has been rejected by the doubles gate of the machine, it is desirable to reinsert the bill into the regular input line of the machine for demonetization. In this event, the doubles override activation switch 162 is depressed by the operator, causing an input signal to be provided along the line 500 to a set/reset flip-flop 502. Thus, the Q output of the flip-flop 502 goes high, thereby setting the JK flip-flop 504. Receipt by the flip-flop 504 of a START OF BILL pulse which may be derived from line 232 (gate 228 - inverter 230 - FIG. 3A), is applied along the clock input line 506, causing the Q output of the flip-flop 504 to go high. As a result, a high signal is applied along the line 508 to the inverter 510. The inverter 510 translates the high signal to a low which is applied along the line 331 to the input of the NAND gate 332 shown in FIG. 3A. The low signal along the line 331 clamps the output of the NAND gate 332 to a high condition which, as set forth in conjunction with the explanation of FIG. 3A, will allow the shift register 302 to be reset without regard to the output condition appearing along the line 252 from the NAND gate 208. Thus, the doubles gate solenoid 342 remains fixed in an acceptance condition and will not reject any bill fed along the regular input as a result of activation of the doubles override 162. In addition, the output pulse from gate 333 will continue to increment the strap input counter 110, thus counting each additional bill fed in under doubles override. As is noted above, the presence of a rejection situation prevents the strap input counter from counting since it is the clear signal on line 335 which is employed to increment the strap input counter 110. Thus, on a doubles override, the strap input counter 110 now counts the bill input, although the doubles gate is clamped.

The flip-flop 504 also sends a low signal along the output line 512 upon activation by the doubles override switch 162 to a NAND gate 514. As a result of the low signal appearing along the line 512, the NAND gate 514 sends a high output signal along its output line 516, and which is inverted through inverter 517 and applied to two branches, lines 319 and lines 340 corresponding to the lines 319 and 340 inputs to the NAND gates 318 and 339 respectively in FIG. 3A. As a result, the doubles gate solenoid 332 is clamped in its acceptance position, thereby preventing rejection of the bill as a double, and the fit-unfit solenoid 322 is clamped in its unfit condition, thereby channeling the bill to the demonetizer. Since the override condition channels the bill to the demonetizer by clamping the bill such that it is automatically channeled along the unfit path, ultimate receipt of the bill in the unfit stacker will cause an incrementing low pulse to be applied along the line 386, as shown in FIG. 4A, to the input of the NAND gate 518 shown in FIG. 6. The NAND gate 518 will translate the low signal to a high applied to the inverter 519, the resulting low being applied to the reset input of flip-flops 502 and 504, thereby resetting the flip-flops 502 and 504 and removing the doubles override signals from the input logic. As a result, each doubles bill that has been rejected and refed into the system will serve to actuate a reset condition in the override logic such that the override applies only to each individual doubles rejected bill as it is reinserted into the machine. The doubles condition 162 must be reactivated for each successive bill fed into the machine.

A further function is provided by the specials override 172. As was stated above, the function of the specials override is to allow the demonetization of previously stacked special bills. Thus, after a plurality of special bills have been collected the special override function switch 172 is activated, applying an input signal along the line 520 to the clock input of the J-K flip-flop 522. The Q output of the flip-flop 522 thus goes high applying a high input to the J input of the flip-flop 524, thereby setting the flip-flop 524 for activation upon receipt of a pulse at its clock input along the line 506. The presence of a signal along the line 506 indicates properly timed bill detection at the regular input scan head, and causes the flip-flop 524 to be set, thereby rendering its Q output low. The low condition is applied along the line 526 for application along line 174 to the strap input counter 110 shown in FIG. 2. As was described above, the function of the inhibit signal applied along the line 174 is to prevent the strap input counter 110 from recounting the special bills as they are fed along the regular input for demonetization. Activation of the doubles function 162 at this time is prevented by means of a clamping signal applied along the line 528 to the NAND gate 518 which thus maintains the flip-flops 502-504 in their reset condition. In addition, the output Q̄ of the flip-flop 524 is fed through the NAND gate 514 along the line 156 to the lines 324 and 334 for clamping the doubles gate and fit/unfit gate respective to a condition which will prevent rejection of a bill as a double and which will channel each special bill fed into the regular input to the demonetizing printer as an unfit bill, in the same manner as described in conjunction when the doubles override.

Since it is desired in this instance that the special override operate continuously, no reset function is provided from the NAND gate 518 to the flip-flop chain 522-524. Reset is provided by reactivating the specials function switch 172.

The foregoing logic may be physically arranged, using discrete components or known solid state techniques such as medium or large scale integrated chips, into a relatively small unit.

In summary, what has been illustrated is a logic scheme utilizing the timing scale of the feed system for synchronizing decision functions for sorting and fitness in a secure manner. The system thus illustrates the incorporation of several features which enable currency to be sorted in as error free a manner as possible taking into account the inexperience of an operator and the environment in which the device will normally be employed.

Since the various elements shown in the system are made up of standard components, and standard asemblies, reference may be had to "High Speed Computing Devices" by the staff of Engineering Research Associates, Inc., McGraw-Hill Book Company, Inc., 1950; and appropriate chapters in "Computer Handbook", McGraw-Hill, 1962; edited by Harvey D. Huskey and Granino A. Korn, and for detailed circuitry, to for example, "Principles of Transistor Circuits", edited by Richard F. Shea, published by John Wiley and Sons, Inc., New York, and Chapman and Hall, Limited, London, 1953 and 1957. In addition, other references are: for system organization and components: "Logic Design of Digital Computers", by M. Phister, Jr., (John Wiley and Sons, New York); "Arithmetic Operations in Digital Computers", by R. K. Richards (D. Van Nostrand Company, Inc., New York). For circuits and details; "Digital Computer Components and Circuits", by R. K. Richards, (D. Van Nostrand Company, Inc., New York).

In addition, although power supplies, interlocks, protective devices and on-off switches have not been shown, such elements are obviously included in such a system in accordance with good engineering practice. Since such elements and techniques are obvious to those skilled in the art, they have not been shown so as not to obfuscate the basic teaching of the inventive concept.

In determining the fitness or unfitness of a bill for continued circulation and in determining whether a bill constitutes a double, a bill being examined is transported through an examination station at which location a beam of light is projected at one surface of the bill and a photodetective means positioned on an opposite side of the bill senses the level of light transmittance through the bill. A scanner apparatus of this type is disclosed in copending U.S. patent application Ser. No. 457,388 filed concurrently herewith and which is assigned to the assignee of this invention. The photodetection means includes a phototransistor which generates an electrical signal having an amplitude proportional to the intensity of the light which is focused on the transistor. The output levels of the signal are then examined by a circuit means, illustrated in FIG. 7, in order to determine the presence of a bill, the fitness or unfitness of the bill and whether a double bill is present at the examination station. The circuit arrangement of FIG. 7 in general provides for integrating the phototransistor signal during the transist of the bill through the examination station, for determining whether the integrated transmissivity attains a predetermined reference level indicative of the fitness of the bill, and for setting a bistable device upon such a determination. The circuit arrangement further senses the light level during the presence of a bill and compares this level with a predetermined reference level representative of the presence of a double at the examination station. Upon determination of the existence of a double, a bistable device is set to a corresponding condition. The circuit arrangement further includes means for automatically compensating for variations in the light intensity of a lamp in a light source which can occur as a result of variations in the lamp, aging, etc.

Figure 7:
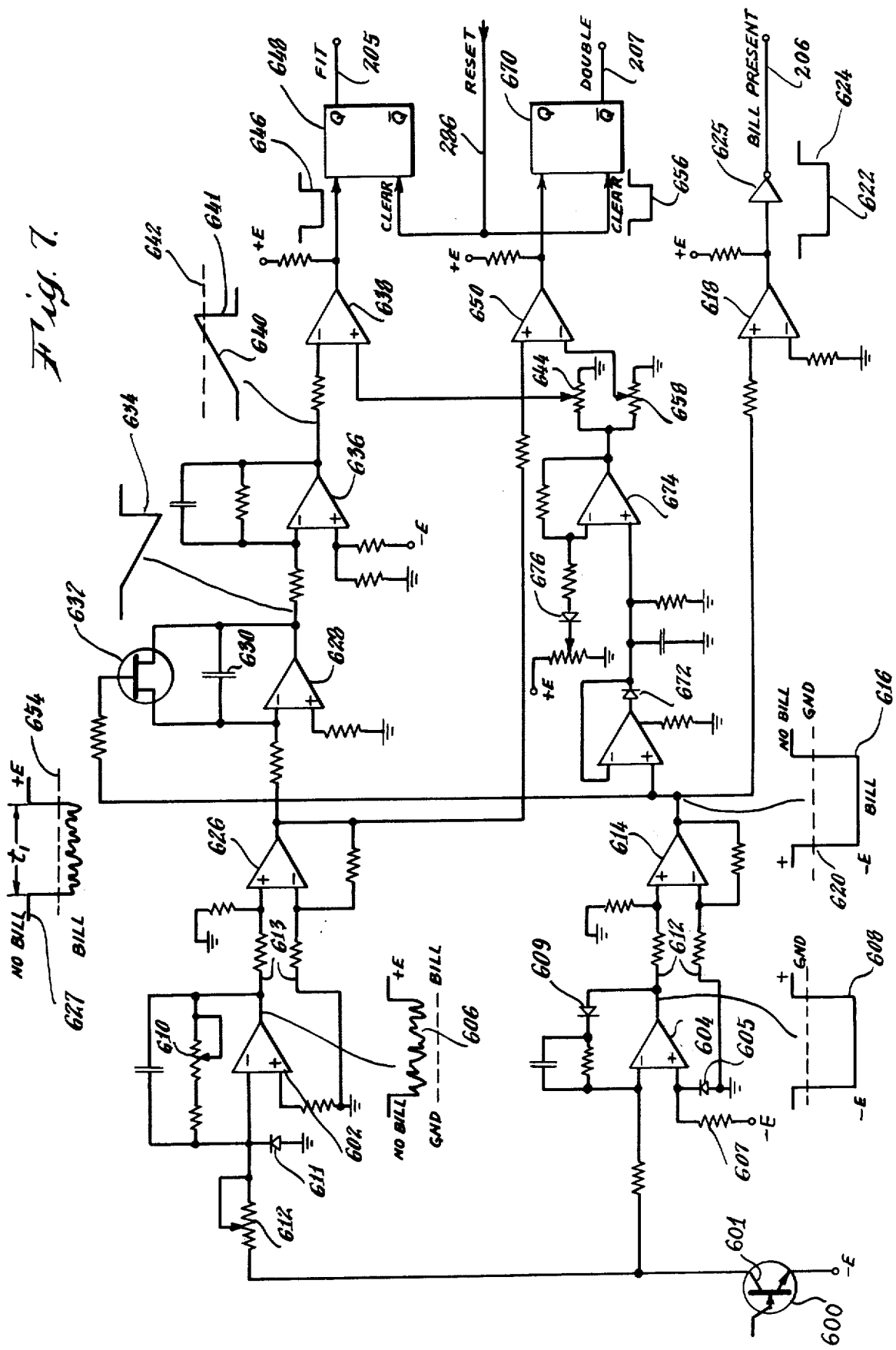
FIG. 7 is a detail of the input quality detection circuit.

Referring now more particularly to the circuit arrangement of FIG. 7, a phototransistor 600 is provided and operates as a current source wherein the current increases and decreases as the intensity of the light focused on the phototransistor increases and decreases respectively. A collector electrode 601 of the phototransistor 600 is coupled to an inverting, operational preamplifier 602 in a bill quality examination channel and to an inverting, operational preamplifier 604 in a "bill present" channel. The output signals from these preamplifiers are indicated by the waveforms 606 and 608, respectively. During the transist of a bill through the examination station, a signal generally illustrated by waveform 606 appears at the output of amplifier 602. The level of this waveform is related to the amount of light passing through the bill and impinging on phototransistor 601 - the more light results in more current through the feedback network around amplifier 602 and thus a higher level output excursion, and conversely, the less light results in a lower level signal. A higher level is understood to mean a relatively positive deviation in DC level from ground level; conversely, a lower level means a relatively smaller positive deviation from ground level. Potentiometer 610 in the feedback network is used to adjust the gain of amplifier 602. The input signal for inverting amplifier 604 is the voltage drop caused by the phototransistor current passing through adjustable resistor 612. The non-inverting terminal of amplifier 604 is at a potential of approximately minus .5 volts caused by the voltage drop across a diode 605 due to the current flow through resistor 607 to −E. During the transit of a bill through the examination station, the current flow through resistor 612 to the "Virtual ground" of amplifier 602 is not large enough to cause the collector voltage of phototransistor 601 to drop below the negative voltage level at the non-inverting terminal of amplifier 604, thus causing the output of amplifier 604 to go negative. Diode 609 prevents current from flowing toward the output from the input of amplifier 604, thus inhibiting the normal feedback path and forcing the output of amplifier 604 to negative saturation (Approximately −E). This voltage will remain at approximately −E as long as a bill in transit is between the light source and the phototransistor 601. After the bill has passed between the light source and the phototransistor 601, there is a significant increase in the collector current output, since the phototransistor is now looking directly at the light source. This current passes through resistor 612 and the feedback resistors around amplifier 602, causing the output of amplifier 602 to go to positive saturation (approximately +E). At the same time, the current drop through the feedback resistors causes the inverting terminal of amplifier 602 to pull away from "virtual ground" and go negative. However, diode 611 catches it, preventing it from going more than a diode drop below ground. The current through resistor 612 is now large enough to cause the voltage on the collector of phototransistor 601 to be more negative than the voltage level on the noninverting terminal of amplifier 604, causing the output of the amplifier to go positive. Diode 609 now is biased forward, and amplifier 604 acts as a normal inverting amplifier, the voltage output at which it is now proportional to the current going through phototransistor 601, and hence, which is proportional to the light level. The output level of amplifier 602 may be calibrated by adjusting resistor 612.

The preamplified signal of the amplifier 604 is applied through two wire cable 612 to a differentially coupled, operational amplifier 614, which is located elsewhere in the machine and has a gain of 1. Differential coupling is provided in order to cancel noise due to pickup and differences in ground potential between the preamp and the ground associated with amplifier 614. An output signal from this amplifier, illustrated by the waveform 616, is applied to the non-inverting input of comparator 618 which is arranged as a "bill present" level sensing comparator. When a bill is present at the examination station, the light level impinging on the phototransistor 601 will be reduced and the corresponding DC output level of the amplifier 614 will be about −E. As this output signal is below ground reference level, represented by the dashed line 620, and which level is established at the inverting input of the comparator 618, the comparator 618 will provide a low DC output during the transit of the bill through the examination station. The relatively negative level 622 of the waveform 624 is representative of the presence of a bill at the examination station, and for use in the logic described in FIG. 3A, is passed through the inverter 625 along line 206.

In the bill quality detection channel, an output signal from the amplifier 602 is applied through two wire cable 613 to a differentially coupled, operational amplifier 626. The differential coupling of this amplifier, as with the amplifier 614, is provided for cancelling noise due to pickup and differences in ground potentials. An output signal from this amplifier having a waveform 627 is integrated over an interval of time $t_1$, which corresponds to the transit time of the bill through the examination station. The integration is performed by an operational amplifier 628 which is coupled as an integrator. An integrating capacitor 630 is shunted by a field-effect-transistor 632, which is normally conductive, and which disables the operation of the amplifier as an integrator. However, when a relatively negative output level is provided by the amplifier 614, the field effect transistor 632 is cut off, thereby enabling the integrating capacitor 630 to charge. Since this control of the field effect transistor is coincident with the presence of the bill, the integration will occur over the period ot time $t_1$ during which a bill is being examined. An output signal from the integrator 628, represented by the waveform 634, is applied through an inverting, operational amplifier 636 to bill fitness comparator 638. The integral of the light intensity of a bill during the transit of a bill will increase in accordance with the ramp segment 640 of a waveform 641. When a fit bill is examined, the amplitude will increase to a predetermined level 642, representative of the level of a bill considered to be fit. This reference level is established at the comparator 638 by a potentiometer 644. Upon attaining this level, the comparator 638 switches and provides a negative going output signal 646 which sets a bistable device comprising the flip-flop 648. The Q output of the flip-flop is forced to a high level indicating that a fit bill has passed through the examination station, and is passed along output line 205 (FIG. 3A). The flip-flop 648 is reset by an input provided along line 286 (FIG. 3A).

An output signal from the amplifier 626 is also applied to a comparator 650 which is arranged as a doubles level comparator. When the level of this output signal reaches a negative reference level represented by the dashed line 654, the comparator 650 will switch and generate a negative going output signal 656. The reference level 654 at which the comparator switches is established by a potentiometer 658. The potentiometer is adjusted for providing a triggering level equivalent to a light intensity level which is sufficiently dark for indicating that a double or overlapping bills have passed the examination station. The output signal 656 of the comparator 650 is applied to a bistable device comprising the flip-flop 670 and sets the flip-flop to provide a high Q output indicating the presence of a double or overlapping bills at the examination station. The double signal is passed along line 207 to the gate 208, FIG. 3A, as described above. The flip-flop 670 is also reset by the pulse applied along line 286. Both the fitness and doubles reference levels can be readily determined emperically by positioning bills having known light transmissivity characteristics at the examination stations and adjusting the potentiometers 644 and 658 for triggering of the associated comparator.

Variations which may occur in the output of the lamp light source from a pre-established intensity in the absence of a bill are detected and are used for automatically varying the reference input levels to the fitness comparator 638 and to the doubles comparator 650. As indicated hereinbefore, the amplifier 614 provides a relatively positive output level in the absence of a bill at the examination station. This positive output level is proportional to the maximum light intensity which impinges upon the phototransistor 600. Variations in this relatively positive level and which are indicative of variations in the operating characteristics of the lamp are applied to an operational amplifier and peak detector circuit 672. The output of this circuit provides a DC level proportional to the light intensity in the absence of a bill. As this intensity, and thus, the input DC level from the amplifier 614 under no bill conditions varies, the potential at the output of the peak detector 672 will also vary. This potential is applied to the positive input of an operational amplifier 674 having an output thereof coupled to the level setting potentiometers 644 and 658. Thus, variations in the operating characteristics of the lamp will cause a corresponding and compensating variation in the reference level setting potentiometers of the fitness and doubles comparators. Due to the fact that the output current phototransistor 601 as a function of impinging light level follows a different slope depending on whether a bill is between the light source and the phototransistor or not, a non-linearizing network 676 is provided around amplifier 674 to bring the light level compensation voltage output of amplifier 674 into conformity with the bill signal level. This is accomplished by network 676 which increases the gain of amplifier 674 once the light level voltage from peak detector 672 increases beyond the level set by the potentiometer in network 676.

Figure 8:
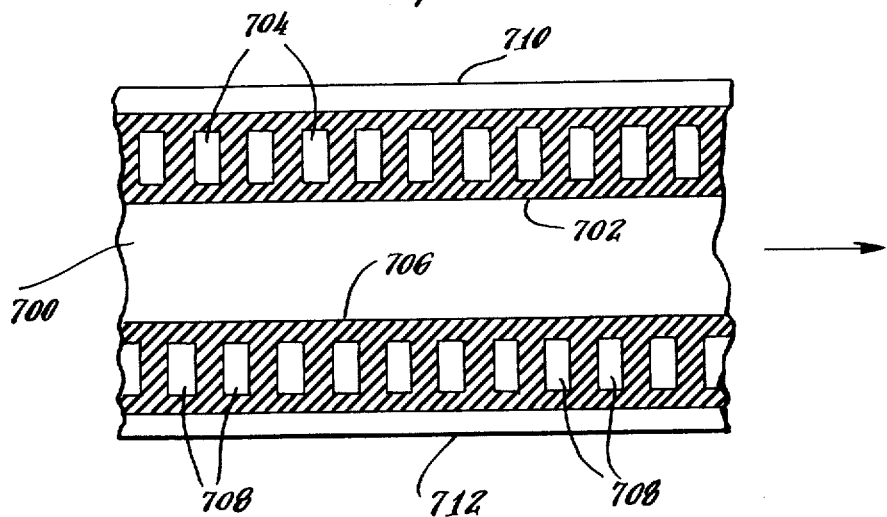
FIG. 8 is a view of a segment of a demonetize bill.

A bill which has been demonitized bears a distinctive and noticeable marking printed in ink on the bill. A demonetizing marking is shown in FIG. 8 to comprise a first relatively dark strip 702 which frames a plurality of relatively light bars 704 and a second relatively dark strip 706 which similarly frames a plurality of relatively lighter bars 708. The strips 702 and 706 are formed on a same surface of the bill near outer edges 710 and 712 respectively. While these strips are similar in configuration, it will be noted that these strips are positioned on the bill in a manner for providing that the bar 704 is adjacent a dark segment of the strip 706 while a bar 708 is adjacent a dark segment of the strip 702. As indicated hereinafter, this displacement of the bars 704 and 708 results in the generation of out-of-phase signals. A similar set of side by side strips is printed on the opposite side of the bills so that a total of four strips are printed on each bill.

For security reasons, it is desirable that the apparatus detect the introduction of a preprinted, demonetized bill into the apparatus and that the proper operation of the printer-inker be verified by postprint detection of the demonetizing markings on a bill. To this end, the scanning head includes, in addition to the light transmissivity detection means, a reflective detector which senses for the presence of a demonetizing marking on the bill. A scanning head of the apparatus is provided with optical and photodetection means for examining the reflectance of the bill for the presence of the demonitizing marking. A scanning head of this type is disclosed in detail in copending U.S. patent application Ser. No. 457,388, which is filed concurrently herewith and which is assigned to the assignee of this invention. A pair of photodetectors are provided and are mounted in side-by-side relationship and are laterally displaced by a distance for providing that one photocell is aligned with the center of the bars 704 while another photocell is aligned with the bars 708 in the direction of movement of the bill as indicated by the arrow in FIG. 8. Light which is incident on the bill is reflected and is focused on the photocells. The light impinging on the photocells is alternating in intensity because of the light, dark, light, dark pattern formed by the strips. A similar detector means is also provided at an output station of the demonetizing printer-inker. This is disclosed in greater detail in copending U.S. patent application Ser. No. 457,366 which is, filed concurrently herewith, and assigned to the present assignee.

A circuit means, corresponding to circuit 402 in FIG. 5, is provided for operating on the electrical signals generated by the photodetection means. This circuit provides digital output which is representative of the presence or absence of a demonetizing marking on the bill. A circuit means of this type for examining a bill for the preprinted demonetizing marking is illustrated in FIG. 9. In general, the circuit arrangement combines the signals from the phototransistors in a way which enhances the alternating signals due to the demonitizing bars while reducing sinals due to normal bill reflections and due to reflected light when no bills are passing the examination station. The resultant signal is filtered, squared and utilized to generate a staircase function within a predetermined time window shorter in duration than the transit time of a bill through the examination station. When the staircase function attains a predetermined level indicative of the detection and verification of the presence of the demonetizing bars, a bistable device is set to a condition indicating the passage of a demonitized bill through the examination station. The circuit of FIG. 9 additionally includes means for automatically compensating for variations in the light source which can result in corresponding variations in the illumination of the bill being examined.

Referring now to FIG. 9 for a more detailed description of the circuit arrangement, a phototransistor 720 which, as indicated, is aligned with bars on one strip such as the strips 702 in FIG. 8, generates an electrical signal representative of the variations in reflection of the bill. The transistor 720 functions as a current generator which is coupled to an input of an operational amplifier 722, functioning as a preamplifier. The amplified output signal is represented by the waveform 724. Similarly, a phototransistor 726 which is aligned with the strip 706 of FIG. 8 is coupled to an operational amplifier 728, which preamplifies the signal generated by the transistor 726 and provides an amplified output signal as represented by the waveform 730. It will be noted, that in the absence of a bill at the examination station, the output level of each of the amplifier 722 and 728 is relatively negative. A pair of reflective strips formed of silver or aluminum, for example, are positioned at the examination station. In the absence of a bill, substantially all of the light which would impinge upon the bill at this location is reflected to the transistors 720 and 726. This maintains the output of the operational amplifiers 722 and 728 at a relatively negative level until a bill is introduced to the examination station. The light intensity is thereby decreased substantially, and the output level of these amplifiers becomes relatively more positive.

The outputs of preamplifiers 722 and 728 are fed to a difference circuit which subtracts one signal from the other. However, the portions of the signals due to the pickup from the demonetization bars are out of phase with each other, and thus, effectively add, whereas the signals due to normal bill reflections subtracted. The resultant is an increased bar-to-background pickup signal. The reflected light (when no bill is present) also gets subtracted. A sum of the phototransistors signals is also formed which is used to provide a signal which is proportional to the sum of light level pickup of the phototransistors. A difference signal is provided by coupling the output of the amplifier 722 to one input of a differentially coupled operational amplifier 732, and the output of the amplifier 728 to another input of this amplifier. The resultant output signal having idealized waveform 734 is generated, and is coupled to an active filter 736 which passes a predetermined frequency corresponding to the bar frequence of the demonetizing markings. The amplified signal 734, which is thus filtered, is fed to a negative input of an operational amplifier 738 arranged as a comparator. The output of the comparator comprises a square waveform having a frequency corresponding to the frequency of the bar signal 734. As indicated below, a reference potential applied to the positive input of the operational amplifier 738 is variable in order to automatically compensate for variations in the light output of the lamp.

Output signals from the amplifiers 722 and 728 are applied to a resistive summing network 740 at the input of an operational amplifier 742. An inverted and amplified output sum signal, which is substantially free of the out-of-phase AC bar signal components, is provided having the waveform 744. The negative excursions of this signal represent the sum of the reflected light pickup of the two phototransistors when no bill is present. The peak amplitude of negative variations from this level is sensed by a negative peak detection circuit 746 which provides a DC output signal. This signal varies in magnitude in accordance with variations of light level, and is applied to a potentiometer 748 for establishing the reference input level of the comparator 738.

A bill sensing operational amplifier 750 arranged as a comparator generates an output signal 752 which is representative of the presence of a bill at the examination station. The time duration $t_1$ of the positive component of this waveform corresponds to the transit time of a bill at the examination station. Although the negative and positive inputs to this comparator are derived from the output of the amplifier 742, during the absence of a bill, the negative input will exhibit a positive voltage with respect to the positive input. This voltage difference is established by the sum of the voltage drops across the negative peak rectifying diode 754, and a diode 756. Accordingly, the comparator 750 will provide a relatively negative output in the absence of a bill. When a bill is being transported through the examination station, the output of the amplifier 742 becomes relatively positive as compared with the DC level on the negative input of 750, thereby causing a relatively positive output level from comparator 750 for the duration $t_1$, of transit.

It is desirable to examine the bar signal for a limited interval of time less than the period $t_1$. In providing this window for examination, the output of the comparator 750 is utilized to time an RC network and generate an RC waveform 762. An RC network comprising the resistive impedance 764 and a capacitance 766 is provided. The comparator 750 is coupled to the junction of these elements through a diode 760. When a bill is present, the output of the comparator 750 becomes positive, thereby cutting off the diode 760 and enabling the capacitance 766 of the RC network to charge to the potential +E. The exponential waveform 762 is coupled to the negative and positive inputs of operational amplifiers 768 and 770 respectively, each of which are arranged as comparators. The triggering level of these comparators is established by potentiometers 772 and 774, respectively. An output level of the amplifier 768 is normally positive, while an output level of the amplifier 770 is normally negative. Under these conditions, an output diode 776 is cut off, while the diode 778 is conductive, thereby maintaining a common output terminal 780 at a relatively negative potential in the absence of a bill. The potentiometer 774 is adjusted for establishing a reference potential at the negative input to the comparator 770, the level of which, enables the comparator 770 to trigger when the exponential waveform 762 achieves an amplitude $E_3$. The output of the comparator 770 then becomes positive, thereby cutting off the diode 778 and causing the terminal 780 to become positive. Similarly, the potentiometer 772 is adjusted to establish a level at the positive input to the comparator 768, for causing this comparator to switch when the exponential waveform 762 continues to rise to the more positive potential $E_4$. At this potential, the comparator 768 switches, causing the diode 776 to conduct and the terminal 780 to return to a negative level. The output at the terminal 780 provides a window or enabling potential, for examining the alternating phototransistor signal during an interval of time $t_2$ which is coincident with, but less than, the bill transit time $t_1$. The interval of time $t_2$ can be varied by adjustment of the potentiometers 772 and 774.

A bar signal from the phototransistors, as indicated hereinbefore, is squared at the output of comparator amplifier 738, and is then applied to an operational amplifier 784 which is arranged as an integrator. A field effect transistor 786 is coupled parallel with the integrating capacitor 788, and the window signal is coupled to the base of this transister from the terminal 780. In the absence of a bill, the relatively negative level of the window signal maintains the field effect transistor 786 conductive, thereby preventing the charging of the integrating capacitor 788. However, when a bill present signal is received, the window signal is generated, thereby cutting off the field effect transistor and enabling the integrator 784. The square wave bar signal represented by the waveform 790 is applied to the negative input of the amplifier 784 during this time, thereby generating an output signal from the integrator having a negative-going staircase waveform 792. The staircase waveform is applied to the positive input terminal of the operational amplifier 794, which is coupled as a comparator. When a demonetized bill having a valid bar configuration formed thereon is detected, the staircase signal will surpass a predetermined reference level 793. The latter reference level is established by the voltage divider 796, which causes the comparator 794 to trigger and generate a negative going output signal 798. this signal is applied along line 404 (FIG. 5) to a bistable device comprising a flip-flop 406 setting its Q output to 1.

Figure 10:
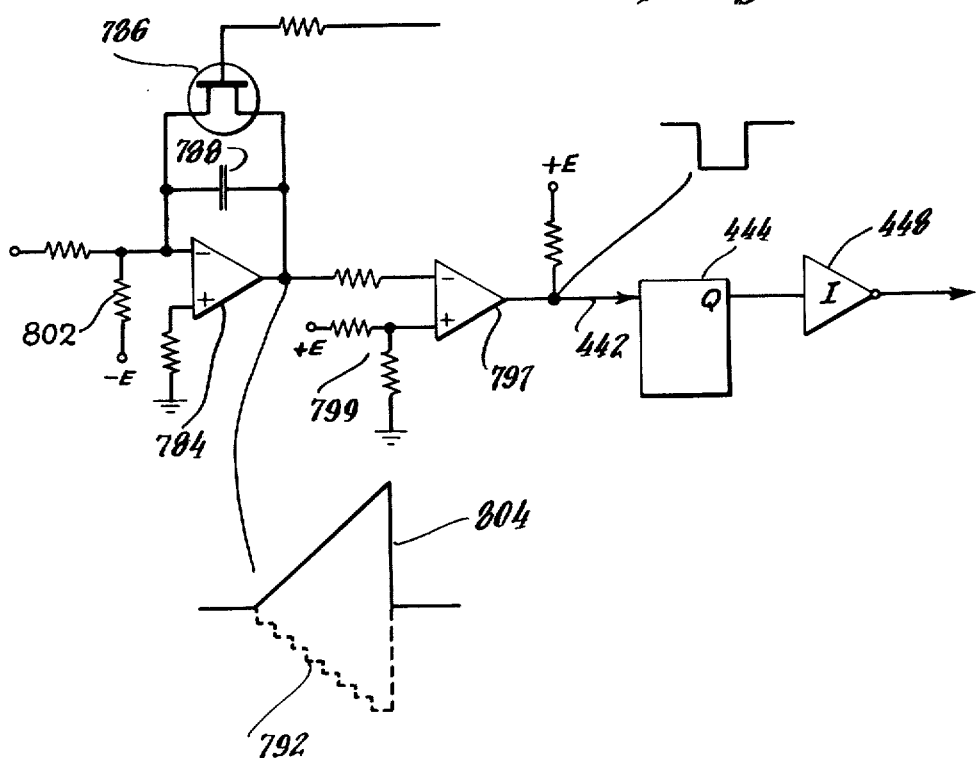
FIG. 10 is a schematic diagram illustrating modifications to the circuit of FIG. 9 for providing postprint detection.

Detection of a malfunction in the printer-inker of the demonetizer will be represented by the absence of the characteristic demonetizing bar signal or of variations in the signal. As indicated, a reflective photodetection maeans is also means at the output of the printer-inker for sensing the occurrence of such a malfunction. A circuit arrangement 440 (FIG. 5), similar to that in FIG. 9, is therefore provided for generating a digital indication of the proper operation of the printer-inker. In this regard, however, it is desirable to generate an output indication only when the printer-inker fails to properly demonetize a bill by printing a demonetizing marking on the bill. The circuit arrangement of FIG. 9, as modified in FIG. 10, is adapted for generating such an output for every demonetized bill. The circuit of FIG. 9 as modified by FIG. 10 inhibits the generation of an output in a postprint detection arrangement unless a proper demonetizing marking fails to appear on a bill. Those elements of FIG. 10 performing functions similar to those of FIG. 9 bear similar reference numerals. The circuit is modified with respect to the integrator 784, which includes resistance 802 returned to a negative potential. In the absence of the application of a bar pattern to the negative input terminal of the integrator, the integrator will provide an output of general configuration having a ramp segment 804. The slope of this ramp segment is equal to the slope of the negative staircase function 792. A properly demonetized bill will cause a bar pattern 792, which will be cancelled out by the ramp 804 at the output of the integrator 784. However, in the absence of a properly demonetized marking, there will be no mutual cancellation of the signals, but rather, the ramp 804 will be provided as an output from the integrator. This output is fed to the comparator 797, thereby causing it to switch once the slope has exceeded the reference level established by bias network 799. This sets a high output at the Q of a postprint bistable device comprising the flip-flop 444. Thus, a positive digital representation is provided by a postprint detector circuit arrangement only in the absence of a proper demonetizing marking signal on a bill.

It will be obvious to the those skilled in the art that many modifications and variations which satisfy many or all of the objects of the present invention may be possible within the scope and framework of the present invention.

What is claimed is:

1. A circuit arrangement for detecting the passage of an article bearing a repetitive marking adapted to repetitively alter the reflectance of light impinging on the marking as the article is transported through an examination station, comprising:
- a first circuit means including a photosensitive device positioned at the examination station for receiving light which is reflected from an article being transported through the station, said first circuit means generating an alternating signal as the article is transported through the station, said signal having a frequency corresponding to a frequency of the repetitive markings on the article;
- integrating circuit means operatively connected to said first circuit means for providing an output signal during the transit of an article having no repetitive marking thereon through the examination station, and for providing substantially no output signal during the transit of an article having a repetitive marking thereon through the examination station;
- a second circuit means for providing a signal for disabling said integrating circuit means in the absence of an article at the examination station, and for enabling the integrating circuit means to provide the integral of said alternating signal during the transit of said article through the examination station;
- comparator circuit means having first and second input terminals, said comparator circuit means providing a first DC output level when the amplitude of a signal applied to said first input terminal is less than the amplitude of a reference signal applied to said second input terminal;
- interconnecting means for applying the integrated signal from said integrating means to the first terminal of said comparator; and
- means for applying a reference signal to said second input terminal of said comparator.

2. The apparatus of claim 1 wherein said second circuit means for enabling said integrating circuit means comprises means for enabling said integrating circuit means for an interval of time which occurs coincidentally with, but is less in duration than, the transit time of an article through the examination station.

3. The circuit arrangement of claim 1 wherein said alternating signal exhibits a sinusoidal waveform, and including a third circuit means operatively connected between said first circuit means and said integrating circuit means for filtering and shaping said alternating signal to provide a substantially square wave signal for application to said integrating circuit means.

4. The apparatus of claim 3 wherein said third circuit means for filtering and wave shaping comprises active filter circuit means coupled in cascade with a second comparator circuit means, and means for establishing a reference potential for said second comparator means.

* * * * *

UNITED STATES PATENT OFFICE
CERTIFICATE OF CORRECTION

Patent No. 3,922,539          Dated November 25, 1975

Inventor(s) W. Robert Carnes, John Balogh, Jr. & Lester L. Selnick

It is certified that error appears in the above-identified patent and that said Letters Patent are hereby corrected as shown below:

Column 1, line 39, before "unfit" insert --only--.

Column 6, line 43, change "adustment" to --adjustment--.

Column 7, line 54, after "FULL" insert --control--.

Column 9, line 48, change "201" to --210--;

line 56, change "314" to --214--.

Column 10, line 32, change "futher" to --further--.

Column 14, line 25, after "later" insert --stage--.

Column 16, line 60, change "Q" to --$\overline{Q}$--;

line 61, change "$\overline{Q}$" to --Q--.

Column 21, line 11, after "FULL" insert --LAMP--.

Column 22, line 39, change "Q" to --$\overline{Q}$--.

Column 25, line 46, change "ot" to --of--.

Column 27, line 47, change "sinals" to --signals--.

Column 28, line 26, change "subtracted" to --subtract--.

Signed and Sealed this

Thirteenth Day of July 1976

[SEAL]

Attest:

RUTH C. MASON
*Attesting Officer*

C. MARSHALL DANN
*Commissioner of Patents and Trademarks*